US012689713B2

(12) United States Patent (10) Patent No.: US 12,689,713 B2
Yamada et al. (45) Date of Patent: Jul. 21, 2026

(54) DISPLAY METHOD AND DISPLAY SYSTEM

(71) Applicant: SEIKO EPSON CORPORATION,
Tokyo (JP)

(72) Inventors: Soma Yamada, Matsumoto (JP);
Kazuhiro Miyoshi, Matsumoto (JP);
Kota Takeuchi, Azumino (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 287 days.

(21) Appl. No.: 18/343,804

(22) Filed: Jun. 29, 2023

(65) Prior Publication Data

US 2024/0007597 A1 Jan. 4, 2024

(30) Foreign Application Priority Data

Jun. 29, 2022 (JP) ................................. 2022-104773

(51) Int. Cl.
| | |
|---|---|
| *H04N 9/31* | (2006.01) |
| *G03B 37/00* | (2021.01) |
| *G06V 10/96* | (2022.01) |
| *G10L 17/26* | (2013.01) |
| *H04R 1/32* | (2006.01) |

(52) U.S. Cl.
CPC ........... *H04N 9/3105* (2013.01); *G03B 37/00*
(2013.01); *G06V 10/96* (2022.01); *G10L 17/26*
(2013.01); *H04N 9/3194* (2013.01); *H04R*
*1/326* (2013.01); *G06V 2201/07* (2022.01)

(58) Field of Classification Search
CPC .... H04N 9/3105; H04N 9/3194; G06V 10/96;
G06V 2201/07; G03B 37/00; G10L
17/26; H04R 1/326
See application file for complete search history.

(56) References Cited

U.S. PATENT DOCUMENTS

| | | | |
|---|---|---|---|
| 2005/0254505 A1* | 11/2005 | Chang | H04L 67/12 |
| | | | 370/401 |
| 2009/0133051 A1* | 5/2009 | Hildreth | H04N 21/42204 |
| | | | 725/28 |
| 2017/0264871 A1 | 9/2017 | Fujiune | |
| 2019/0115019 A1* | 4/2019 | Zurek | G10L 15/22 |
| 2020/0043488 A1* | 2/2020 | Park | G10L 15/22 |
| 2021/0302753 A1 | 9/2021 | Suzuki | |
| 2021/0329203 A1* | 10/2021 | Zhu | H04N 9/802 |

FOREIGN PATENT DOCUMENTS

| | | |
|---|---|---|
| JP | 2013-156903 A | 8/2013 |
| JP | 2017-163431 A | 9/2017 |
| WO | WO2020/031740 A | 2/2020 |

* cited by examiner

*Primary Examiner* — Kyu Chae

(74) *Attorney, Agent, or Firm* — Dority & Manning, P.A.

(57) ABSTRACT

A display method includes obtaining first information for
identifying a user, based on output of a first sensor, obtaining
second information which is related to a position of the user,
based on output of a second sensor, determining a first
direction based on the second information, determining a
type of an image based on a combination of the first
information and the second information, and projecting
image light representing the image of the type toward the
first direction with a projector.

7 Claims, 14 Drawing Sheets

FIG. 4

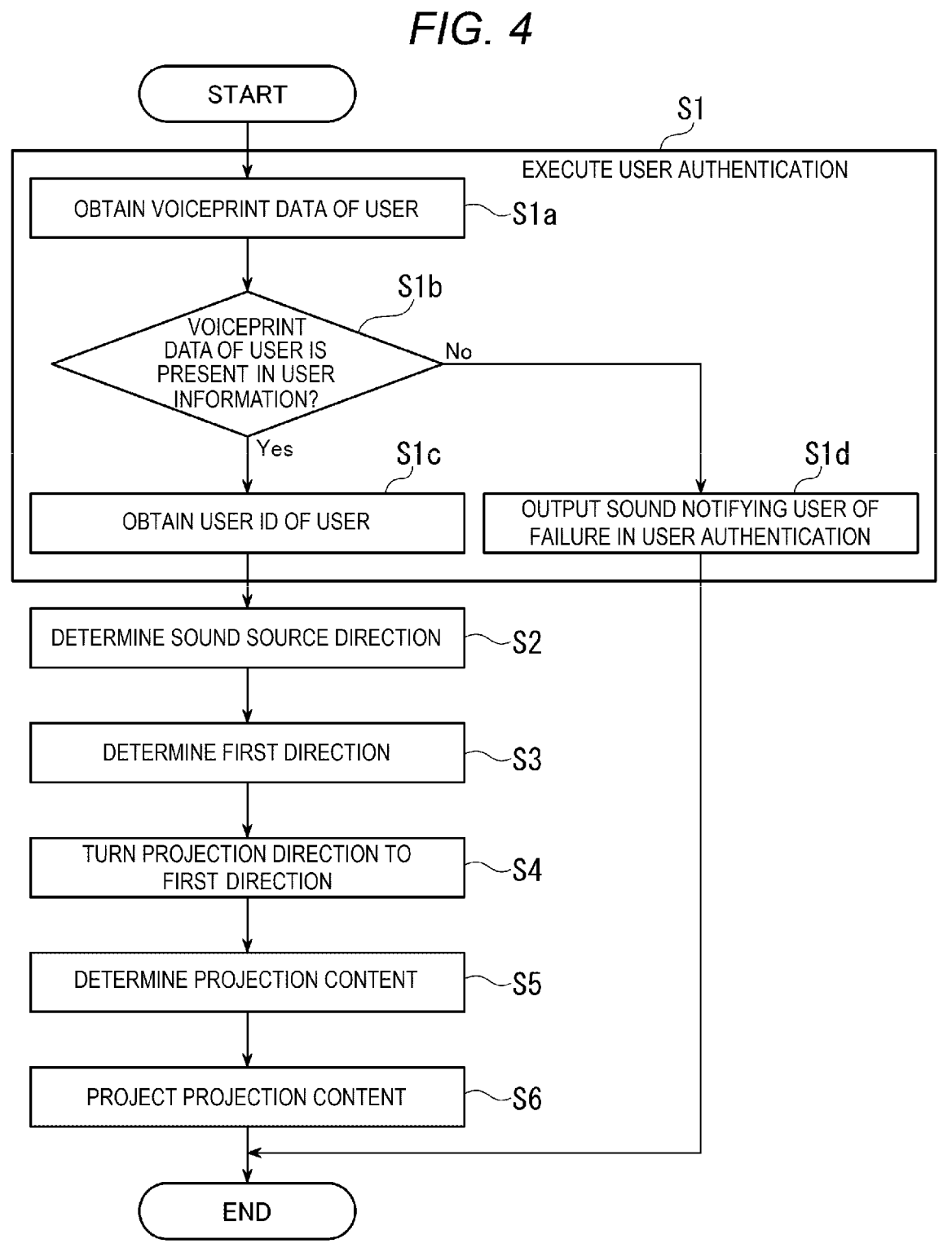

```
        ┌──────────┐
        │  START   │
        └──────────┘
              │
┌─────────────────────────────────────────────────────────────┐  S1
│                              EXECUTE USER AUTHENTICATION       │
│   ┌──────────────────────────────────┐                        │
│   │ OBTAIN VOICEPRINT DATA OF USER   │──── S1a                 │
│   └──────────────────────────────────┘                        │
│              │                                                 │
│         ◇─────────────◇  S1b                                   │
│        ╱  VOICEPRINT   ╲                                       │
│       ╱ DATA OF USER IS ╲   No                                 │
│       ╲ PRESENT IN USER ╱────────────────────┐                │
│        ╲ INFORMATION?  ╱                      │                │
│         ◇─────────────◇                       │                │
│              │ Yes        S1c          S1d    │                │
│   ┌──────────────────────┐   ┌────────────────────────────┐   │
│   │  OBTAIN USER ID OF USER│  │ OUTPUT SOUND NOTIFYING USER OF│ │
│   │                       │   │ FAILURE IN USER AUTHENTICATION│ │
│   └──────────────────────┘   └────────────────────────────┘   │
└─────────────────────────────────────────────────────────────┘
              │
   ┌──────────────────────────────────┐
   │ DETERMINE SOUND SOURCE DIRECTION │──── S2
   └──────────────────────────────────┘
              │
   ┌──────────────────────────────────┐
   │     DETERMINE FIRST DIRECTION    │──── S3
   └──────────────────────────────────┘
              │
   ┌──────────────────────────────────┐
   │  TURN PROJECTION DIRECTION TO     │──── S4
   │       FIRST DIRECTION             │
   └──────────────────────────────────┘
              │
   ┌──────────────────────────────────┐
   │  DETERMINE PROJECTION CONTENT    │──── S5
   └──────────────────────────────────┘
              │
   ┌──────────────────────────────────┐
   │   PROJECT PROJECTION CONTENT     │──── S6
   └──────────────────────────────────┘
              │
        ┌──────────┐
        │   END    │
        └──────────┘
```

Figures 7, 8:
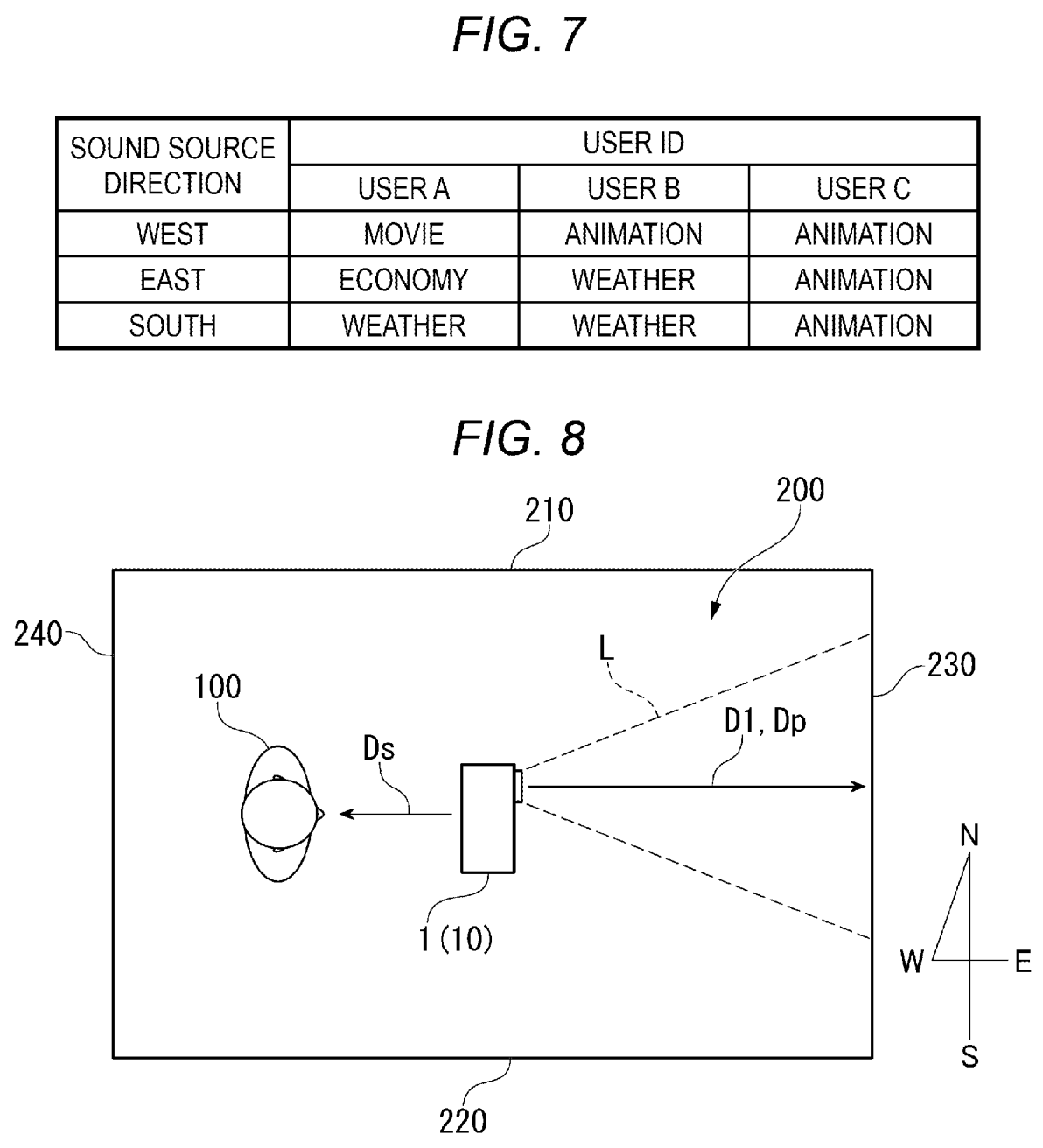

| SOUND SOURCE DIRECTION | USER ID | | |
|---|---|---|---|
| | USER A | USER B | USER C |
| WEST | MOVIE | ANIMATION | ANIMATION |
| EAST | ECONOMY | WEATHER | ANIMATION |
| SOUTH | WEATHER | WEATHER | ANIMATION |

Figure 10:
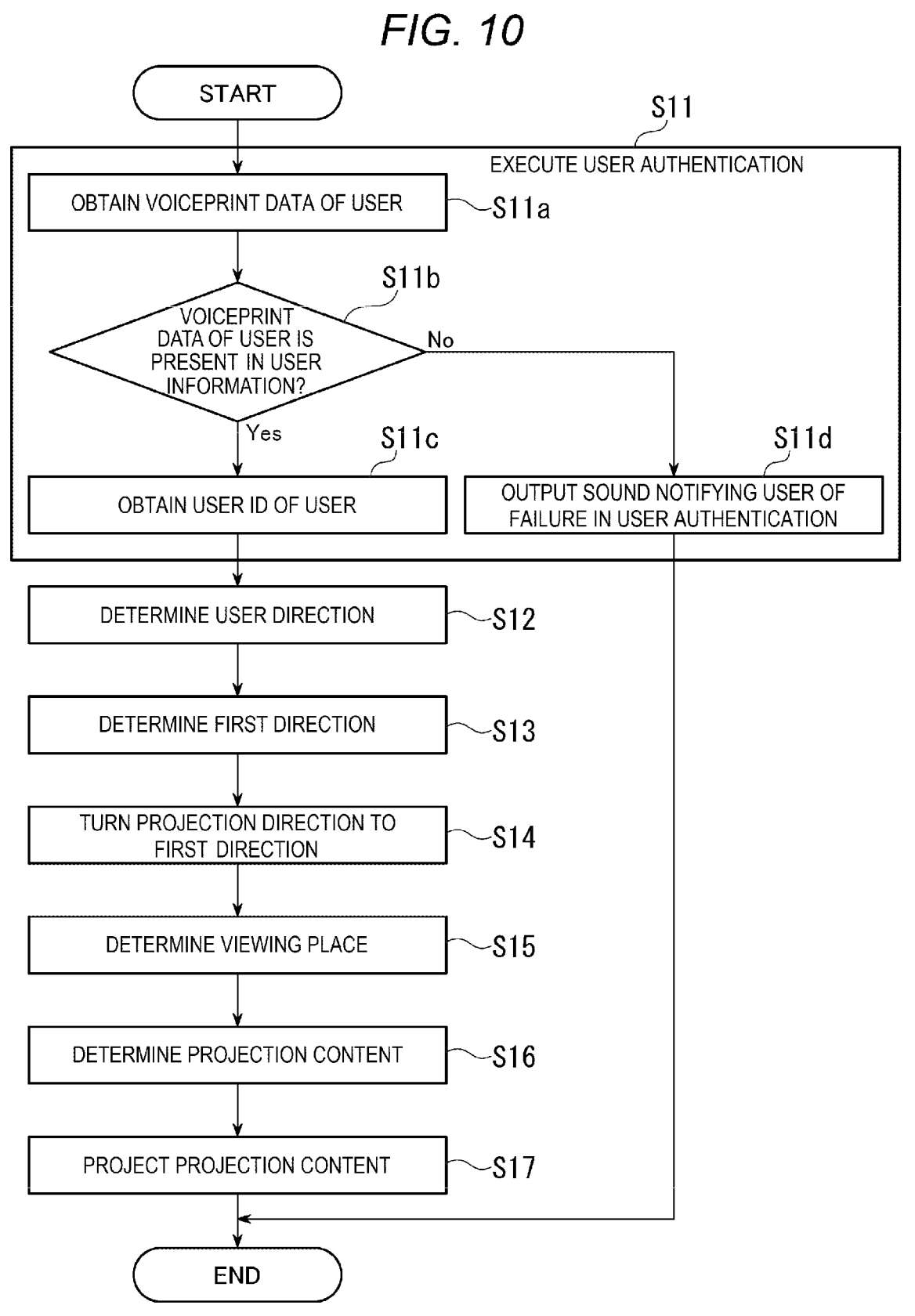

START

S11

EXECUTE USER AUTHENTICATION

OBTAIN VOICEPRINT DATA OF USER — S11a

VOICEPRINT DATA OF USER IS PRESENT IN USER INFORMATION? — S11b

No

OUTPUT SOUND NOTIFYING USER OF FAILURE IN USER AUTHENTICATION — S11d

Yes

OBTAIN USER ID OF USER — S11c

DETERMINE USER DIRECTION — S12

DETERMINE FIRST DIRECTION — S13

TURN PROJECTION DIRECTION TO FIRST DIRECTION — S14

DETERMINE VIEWING PLACE — S15

DETERMINE PROJECTION CONTENT — S16

PROJECT PROJECTION CONTENT — S17

END

FIG. 13

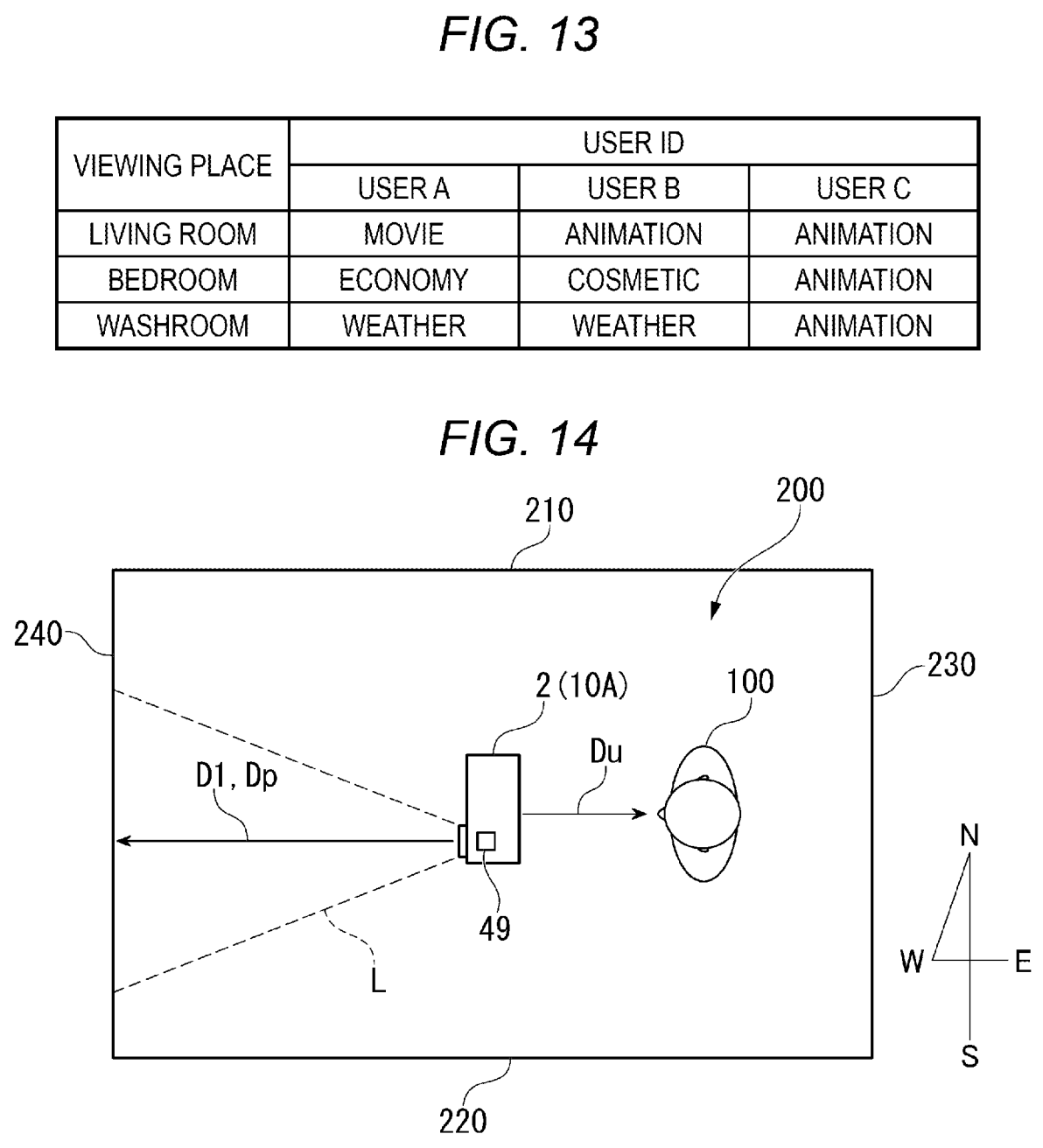

| VIEWING PLACE | USER ID | | |
|---|---|---|---|
| | USER A | USER B | USER C |
| LIVING ROOM | MOVIE | ANIMATION | ANIMATION |
| BEDROOM | ECONOMY | COSMETIC | ANIMATION |
| WASHROOM | WEATHER | WEATHER | ANIMATION |

Figure 16:
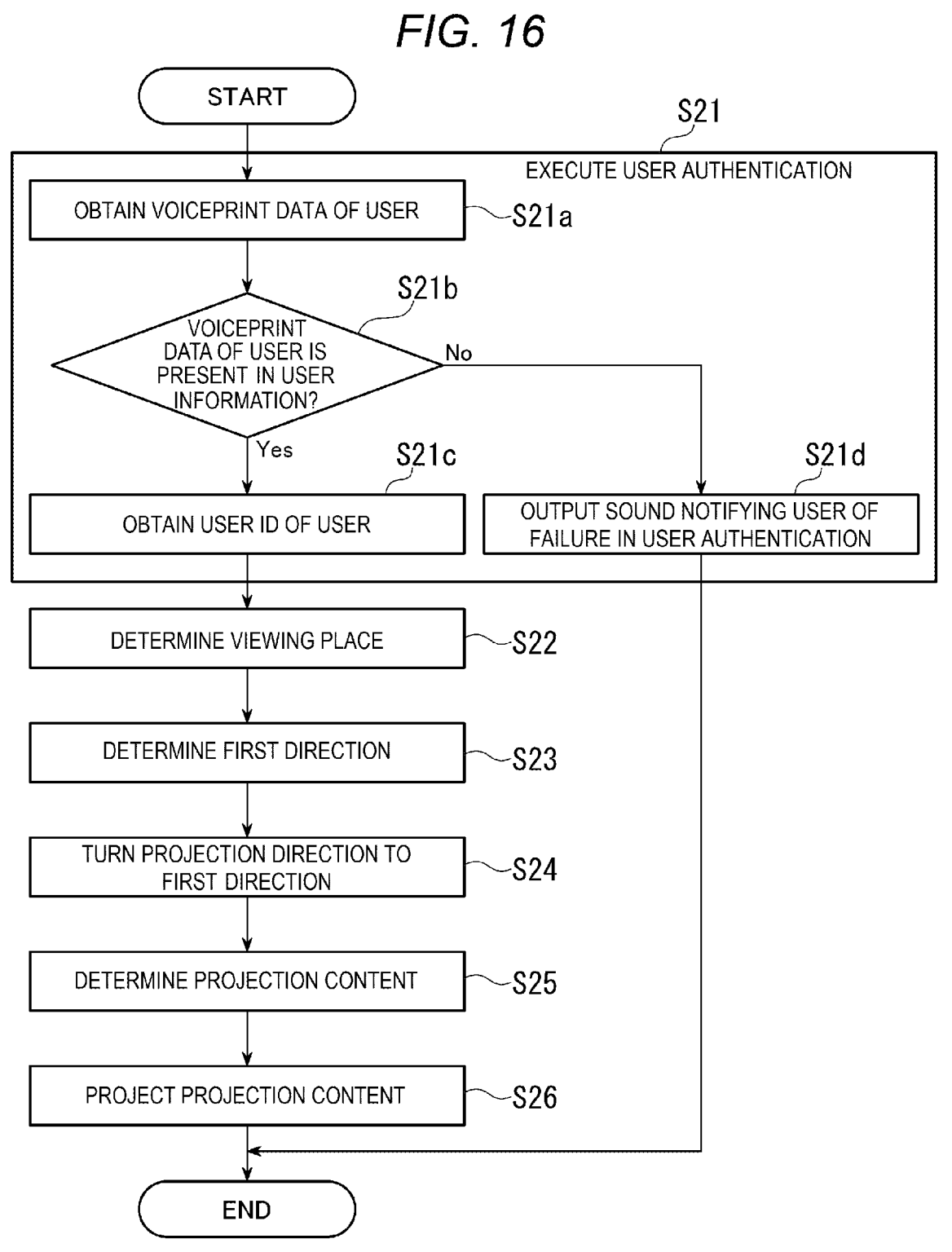

START

S21

EXECUTE USER AUTHENTICATION

OBTAIN VOICEPRINT DATA OF USER — S21a

S21b

VOICEPRINT DATA OF USER IS PRESENT IN USER INFORMATION?

No

Yes

S21c
OBTAIN USER ID OF USER

S21d
OUTPUT SOUND NOTIFYING USER OF FAILURE IN USER AUTHENTICATION

DETERMINE VIEWING PLACE — S22

DETERMINE FIRST DIRECTION — S23

TURN PROJECTION DIRECTION TO FIRST DIRECTION — S24

DETERMINE PROJECTION CONTENT — S25

PROJECT PROJECTION CONTENT — S26

END

| VIEWING PLACE | USER ID | | |
|---|---|---|---|
| | USER A | USER B | USER C |
| LIVING ROOM | WEST | NORTH | CEILING |
| BEDROOM | CEILING | EAST | CEILING |
| WASHROOM | EAST | NORTH | CEILING |

DISPLAY METHOD AND DISPLAY SYSTEM

The present application is based on, and claims priority from JP Application Serial Number 2022-104773, filed Jun. 29, 2022, the disclosure of which is hereby incorporated by reference herein in its entirety.

BACKGROUND

1. Technical Field

The present disclosure relates to a display method and a display system.

2. Related Art

In International Patent Publication No. WO 2020/031740 (Document 1), there is disclosed a technology of adjusting a projection position and a projection orientation of an image content based on environmental information representing a use environment of a projector, and user information related to a user who uses the projector.

For example, a method of determining the projection position, the content, and so on of the image content can affect the convenience of the user, but that method is not described in Document 1. Therefore, in the technology of Document 1, it is difficult to enhance the convenience of the user when the projector variable in projection direction is used.

SUMMARY

A display method according to an aspect of the present disclosure includes obtaining first information for identifying a user, based on output of a first sensor, obtaining second information which is related to a position of the user, based on output of a second sensor, determining a first direction based on the second information, determining a type of an image based on a combination of the first information and the second information, and projecting image light representing the image of the type toward the first direction with a projector.

A display system according to another aspect of the present disclosure includes a first sensor, a second sensor, an optical device configured to project image light, a drive device configured to turn a direction in which the image light is projected to a predetermined direction, and a processor, wherein the processor is configured to execute obtaining first information for identifying a user, based on output of the first sensor, obtaining second information which is related to a position of the user, based on output of the second sensor, determining a first direction based on the second information, determining a type of an image based on a combination of the first information and the second information, and controlling the optical device and the drive device to thereby project the image light representing the image of the type toward the first direction.

BRIEF DESCRIPTION OF THE DRAWINGS

FIG. 4 is a flowchart showing processing to be executed by a processor in the first embodiment.

FIG. 5 is a plan view showing an installation example of the display system.

FIG. 6 is a diagram showing a condition in which a projection direction is turned to a first direction.

FIG. 7 is a diagram showing an example of a first content selection table.

FIG. 8 is a diagram showing a condition in which image light is projected toward the first direction.

FIG. 10 is a flowchart showing processing to be executed by a processor in the second embodiment.

FIG. 13 is a diagram showing an example of a second content selection table.

FIG. 14 is a diagram showing a condition in which image light is projected toward the first direction.

FIG. 16 is a flowchart showing processing to be executed by a processor in the third embodiment.

DESCRIPTION OF EXEMPLARY EMBODIMENTS

Some embodiments of the present disclosure will hereinafter be described with reference to the drawings.

It should be noted that in each of the drawings described below, the constituents are shown with the scale ratios of respective sizes set differently between the constituents in some cases in order to make each of the constituents eye-friendly.

First Embodiment

First, a first embodiment of the present disclosure will be described.

Figure 1:
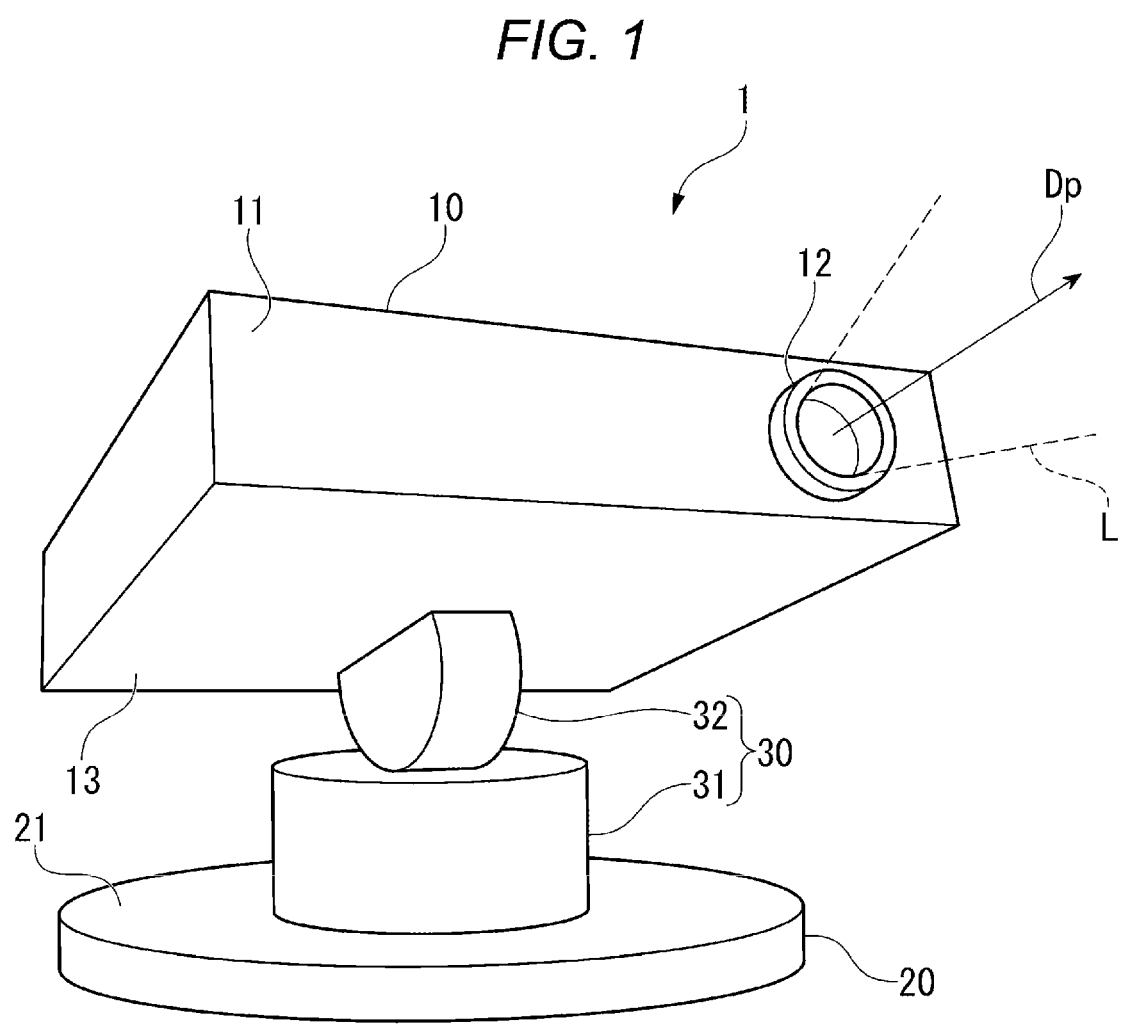
FIG. 1 is a perspective view of a display according to a first embodiment.
Figure 2:
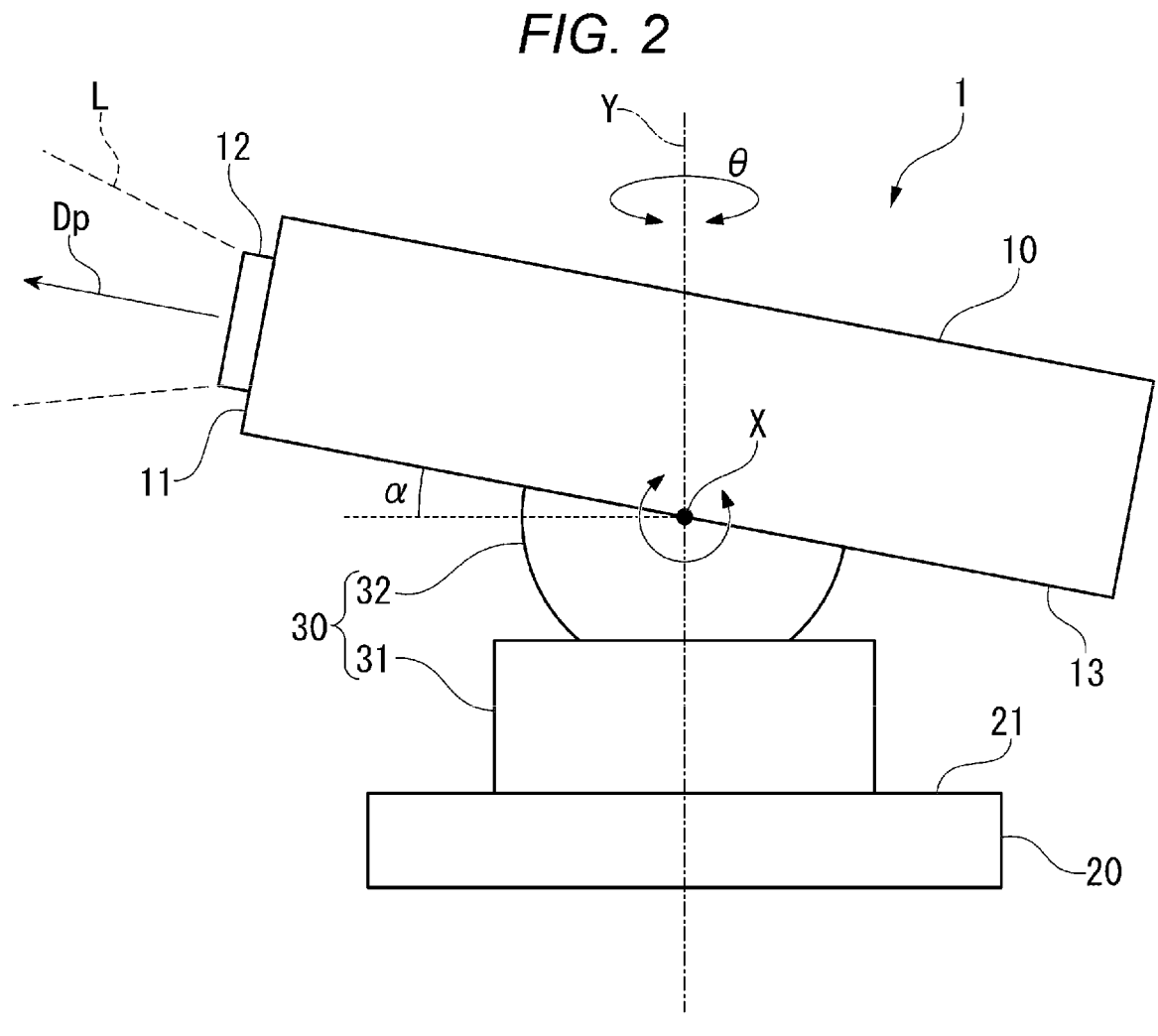
FIG. 2 is a side view of the display system according to the first embodiment.

FIG. 1 is a perspective view showing an appearance of a display system 1 according to the present embodiment. FIG. 2 is a side view of the display system 1 shown in FIG. 1. As shown in FIG. 1 and FIG. 2, the display system 1 is provided with a projector 10, a pedestal 20, and a drive device 30.

The projector 10 projects image light L on a projection surface not shown to thereby display an image on the projection surface. The projection surface can be a dedicated projector screen, or can also be a wall surface or the like. As an example, the projector 10 is a hexahedron having six planes. On a front surface 11 of the projector 10, there is disposed a light exit part 12 for emitting the image light L generated inside the projector In the following description, a direction in which the image light L is projected from the projector 10 is referred to as a "projection direction Dp." For example, the projection direction Dp is a direction perpendicular to the front surface 11, and is a direction of getting away from the projector 10.

The pedestal 20 is a support member for installing the projector 10 at a predetermined place. The pedestal supports the projector 10 and the drive device 30. As an example, the pedestal 20 has a disc-like shape. The drive device 30 is arranged on an upper surface 21 of the pedestal 20, and the pedestal 20 is coupled to a lower surface 13 of the projector 10 via the drive device 30.

The drive device 30 turns a direction in which the image light L is projected, namely the projection direction Dp, to a predetermined direction. Specifically, as shown in FIG. 2, the drive device 30 rotates the projector 10 around at least one of a yaw axis Y and a pitch axis X to thereby turn the projection direction Dp to the predetermined direction. The drive device 30 has a first drive device 31 and a second drive device 32.

The first drive device 31 rotates the projector around the yaw axis Y. As an example, the first drive device 31 has a columnar shape smaller in diameter than the pedestal 20. The first drive device 31 is arranged on the upper surface 21 of the pedestal 20 in a state in which a central axis of the first drive device 31 coincides with a central axis of the pedestal 20. The central axis of the first drive device 31 is the yaw axis Y. By the first drive device 31 rotating around the yaw axis Y, the projector 10 also rotates around the yaw axis Y.

The second drive device 32 rotates the projector 10 around the pitch axis X. As an example, the second drive device 32 has a semicircular column shape. Out of surfaces provided to the second drive device 32, a surface extending in a radial direction of the second drive device 32 is coupled to the lower surface 13 of the projector 10. The second drive device 32 is arranged on an upper end surface of the first drive device 31 in a state in which a central axis of the second drive device 32 is perpendicular to the yaw axis Y. The central axis of the second drive device 32 is the pitch axis X. By the second drive device 32 rotating around the pitch axis X, the projector 10 also rotates around the pitch axis X.

An operation of the drive device 30 configured as described above is controlled by a processor 47 described later. Specifically, a rotational operation around the yaw axis Y of the first drive device 31 and a rotational operation around the pitch axis X of the second drive device 32 are each controlled by the processor 47. More specifically, by each of a yaw angle θ as a rotational angle around the yaw axis Y of the first drive device 31 and a pitch angle α as a rotational angle around the pitch axis X of the second drive device 32 being controlled by the processor 47, the projection direction Dp is turned to the predetermined direction. As described above, in the display system 1 according to the present embodiment, the projection direction Dp of the projector 10 is variable.

Figure 3:
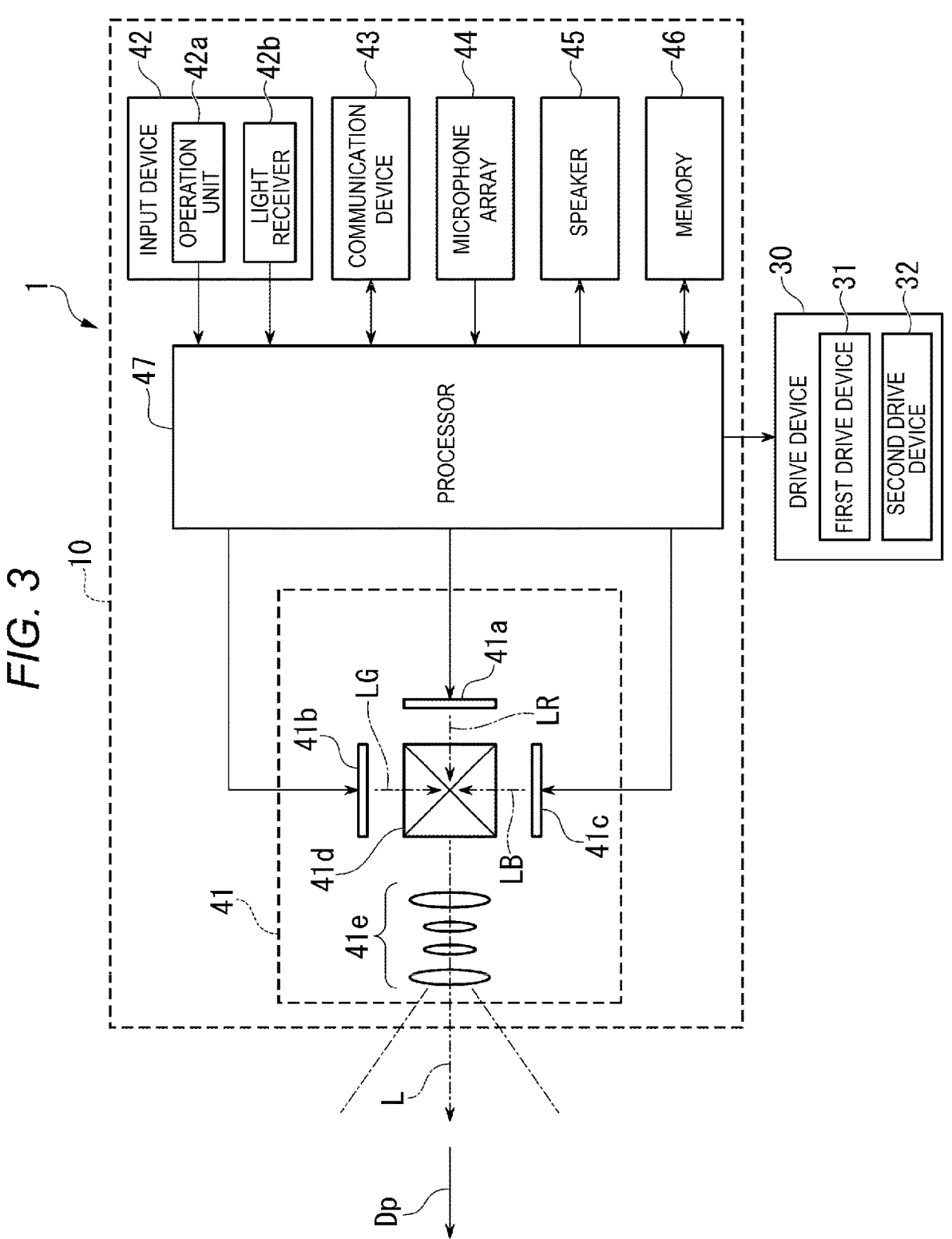
FIG. 3 is a block diagram showing a functional configuration of the display system according to the first embodiment.

FIG. 3 is a block diagram schematically showing a functional configuration of the display system 1. As shown in FIG. 3, the display system 1 is provided with the projector 10 and the drive device 30 described above as constituents having respective functions. Further, the projector 10 is provided with an optical device 41, an input device 42, a communication device 43, a microphone array 44, a speaker 45, a memory 46, and the processor 47.

The optical device 41 is controlled by the processor 47 to thereby generate the image light L representing a color image, and then project the image light L thus generated toward the projection direction Dp. The optical device 41 has a first image generation panel 41a, a second image generation panel 41b, a third image generation panel 41c, a dichroic prism 41d, and a projection optical system 41e.

The first image generation panel 41a generates red image light LR representing a red image, and then emits the red image light LR to the dichroic prism 41d. The first image generation panel 41a has a plurality of pixels arranged in a matrix, and each of the pixels emits red light. By the processor 47 controlling an outgoing light intensity of the red light for each of the pixels, the red image light LR is emitted from the first image generation panel 41a.

The second image generation panel 41b generates green image light LG representing a green image, and then emits the green image light LG to the dichroic prism 41d. The second image generation panel 41b has a plurality of pixels arranged in a matrix, and each of the pixels emits green light. By the processor 47 controlling an outgoing light intensity of the green light for each of the pixels, the green image light LG is emitted from the second image generation panel 41b.

The third image generation panel 41c generates blue image light LB representing a blue image, and then emits the blue image light LB to the dichroic prism 41d. The third image generation panel 41c has a plurality of pixels arranged in a matrix, and each of the pixels emits blue light. By the processor 47 controlling an outgoing light intensity of the blue light for each of the pixels, the blue image light LB is emitted from the third image generation panel 41c.

For example, each of the image generation panels 41a, 41b, and 41c is a light-emitting electro-optic device such as an OLED (Organic Light Emitting Diode) panel, or a μLED (Micro Light Emitting Diode) panel. It should be noted that each of the image generation panels 41a, 41b, and 41c can be a non-light-emitting electro-optic device such as a liquid crystal panel or a DMD (Digital Micromirror Device). When each of the image generation panels 41a, 41b, and 41c is the non-light-emitting electro-optic device, the light from a light source not shown such as an LED is separated into the red light, the green light, and the blue light. The red light enters the first image generation panel 41a. The green light enters the second image generation panel 41b. The blue light enters the third image generation panel 41c. Further, it is also possible to emit light beams of the respective colors in a time-sharing manner using a single-plate image generation panel.

The dichroic prism 41d combines the red image light LR, the green image light LG, and the blue image light LB with each other to thereby generate image light L representing a color image and then emit the image light L to the projection optical system 41e. The projection optical system 41e is constituted by a plurality of optical elements such as a lens, and projects the image light L emitted from the dichroic prism 41d toward the projection direction Dp in an enlarged manner. Although not shown in the drawings, the projection optical system 41e is provided with mechanisms capable of adjusting optical parameters such as a shift amount of a lens, a focus amount of a lens, and a zooming amount of a lens. By those mechanisms being controlled by the processor 47, the optical parameters of the projection optical system 41e are adjusted.

The input device 42 accepts an input operation by the user to the projector 10. As an example, the input device 42 includes an operation unit 42a and a light receiver 42b. The operation unit 42a is constituted by a plurality of operation keys provided to the projector 10. For example, the operation keys include a power key, a menu invocation key, directional keys, a decision key, and a volume control key. The operation keys can be hardware keys, or can also be software keys displayed on a touch panel provided to the projector 10. The operation unit 42*a* outputs an electric signal, which is generated by each of the operation keys being operated by the user, to the processor 47 as an operation signal.

The light receiver 42*b* includes a photoelectric conversion circuit which receives infrared light transmitted from a remote controller (not shown) of the projector 10, and which converts the infrared light into the electric signal. The light receiver 42*b* outputs the electric signal which is obtained by performing the photoelectric conversion on the infrared light to the processor 47 as a remote operation signal. To the remote controller, there is provided a plurality of operation keys similarly to the operation unit 42*a*. The remote controller converts the electric signal generated by each of the operation keys provided to the remote controller being operated by the user into infrared light, and then transmits the infrared light to the projector 10. In other words, the remote operation signal output from the light receiver 42*b* is substantially the same as the electric signal generated by the user operating each of the operation keys of the remote controller. It should be noted that when the remote controller transmits a radio signal in accordance with a near field communication standard such as Bluetooth (a registered trademark), it is possible to dispose a receiver device for receiving the radio signal instead of the light receiver 42*b*.

The communication device 43 accesses the Internet via a wireless LAN (Local Area Network) compatible with a wireless communication standard such as Wi-Fi (a registered trademark) in accordance with an instruction from the processor 47 to communicate with a video content delivery server (not shown) as an Internet server which provides video content delivery service. The communication device 43 outputs the video signal received from the video content delivery server to the processor 47.

The microphone array 44 has a plurality of microphones arranged at predetermined intervals. Each of the microphones converts a voice of the user into the electric signal. The microphone array 44 outputs the electric signals obtained from the plurality of microphones to the processor 47 as voice signals. The speaker 45 is controlled by the processor 47 to thereby output a voice having a predetermined volume.

The memory 46 includes a nonvolatile memory for storing a program and a variety of types of setting data necessary to make the processor 47 execute a variety of types of processing, and a volatile memory to be used as a temporary storage of data when the processor 47 executes a variety of types of processing. For example, the nonvolatile memory is an EEPROM (Electrically Erasable Programmable Read-Only Memory) or a flash memory. The volatile memory is, for example, a RAM (Random Access Memory).

The processor 47 is an arithmetic processing device for controlling operations of the projector 10 and the drive device 30 in accordance with the program stored in advance in the memory 46. Citing an example, the processor 47 is formed of a single CPU (Central Processing Unit) or a plurality of CPUs. Some or all of the functions of the processor 47 can also be configured by a circuit such as a DSP (Digital Signal Processor), an ASIC (Application Specific Integrated Circuit), a PLD (Programmable Logic Device), or an FPGA (Field Programmable Gate Array). The processor 47 executes a variety of types of processing in parallel or in sequence.

The processor 47 controls the drive device 30, the optical device 41, and the speaker 45 based on the operation signal input from the operation unit 42*a*, the remote operation signal input from the light receiver 42*b*, the voice signals input from the microphone array 44, and the video signal input from the communication device 43. The details of the processing to be executed by the processor 47 will be described later.

Then, an operation of the display system 1 configured as described above will be described.

FIG. 4 is a flowchart showing first display processing to be executed by the processor 47 in the first embodiment. When the voice signals are input to the processor 47 from the microphone array 44 in a period in which the processor 47 operates in a voice standby mode for awaiting input of the voice signals, the processor 47 retrieves the program from the memory 46 and then executes the program to thereby execute the first display processing shown in FIG. 4. By the processor 47 executing the first display processing, a display method according to the first embodiment is realized.

Figures 5, 6:
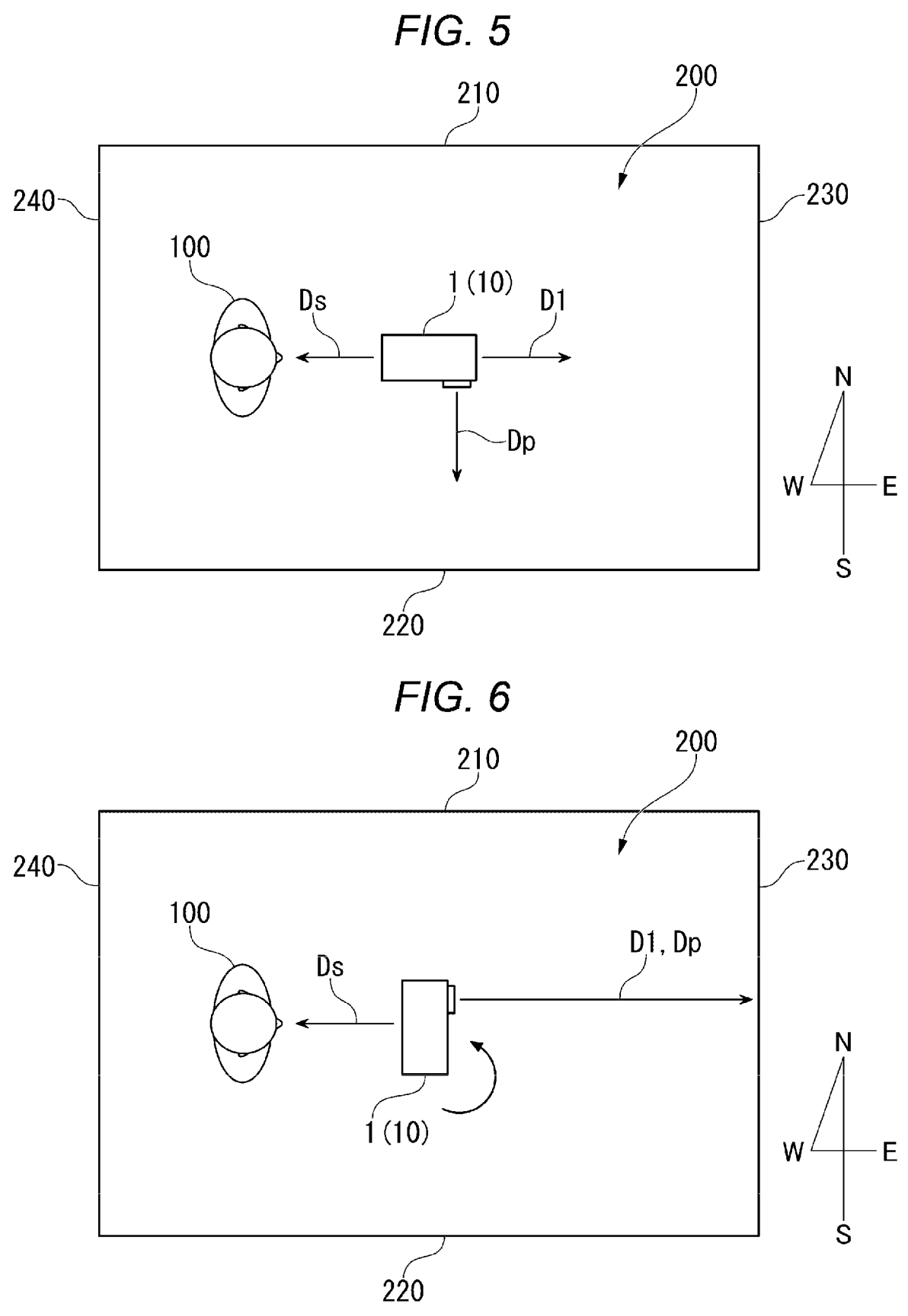

FIG. 5 is a plan view showing an installation example of the display system 1. In the example shown in FIG. 5, the display system 1 is installed at the center in a room 200 disposed at home of the user 100. The room 200 has a north side wall surface 210 located at the north (N) side, a south side wall surface 210 located at the south (S) side, an east side wall surface 210 located at the east (E) side, and a west side wall surface 210 located at the west (W) side. In the following description, as shown in FIG. 5, it is assumed that the processor 47 operates in the voice standby mode in a state in which the projection direction Dp of the projector 10 is a southward direction, and at the same time, the user 100 is located at the west side of the display system 1.

When the user 100 utters in the situation shown in FIG. 5, the voice signals are output to the processor 47 from the microphone array 44. When the voice signals are input to the processor 47 from the microphone array 44 in the period in which the processor 47 operates in the voice standby mode, the processor 47 starts the first display processing shown in FIG. 4.

As shown in FIG. 4, when the processor 47 starts the first display processing, the processor 47 first performs (step S1) user authentication based on the voice signals input from the microphone array 44 and user information stored in advance in the memory 46. The step S1 includes the steps S1*a*, S1*b*, S1*c*, and S1*d*.

The user information is information related to a plurality of users registered as valid users of the display system 1. The users registered as the valid users of the display system 1 are hereinafter referred to as "registered users." As an example, the user information includes user IDs of the registered users, and registered voiceprint data associated with the user IDs. The user ID is identification information of the registered user. For example, the user ID can be a name of the registered user, or can also be an identification number assigned individually to the registered user.

The registered voiceprint data is voiceprint data of the registered user obtained by analyzing the voice of the registered user in advance.

Specifically, in the step S1, the processor 47 first performs frequency analysis on at least one of the voice signals out of the voice signals output from the plurality of microphones included in the microphone array 44 to thereby obtain (step S1*a*) the voiceprint data of the user 100.

Subsequently, the processor 47 determines (step S1*b*) whether or not the registered voiceprint data coinciding with the voiceprint data of the user 100 is present in the user information. When the registered voiceprint data coinciding with the voiceprint data of the user 100 is present in the user information (Yes in the step S1*b*), the processor 47 obtains (step S1*c*) the user ID associated with the registered voiceprint data coinciding with the voiceprint data of the user 100 out of the user IDs included in the user information as the user ID of the user 100.

On the other hand, when the registered voiceprint data coinciding with the voiceprint data of the user 100 is not present in the user information (No in the step S1*b*), the processor 47 controls (step S1*d*) the speaker 45 so as to output a sound of notifying the user 100 of the fact that the user authentication has failed. After the processor 47 executes the step S1*d*, the processor 47 terminates the first display processing to return to the voice standby mode.

As described above, in the step S1, the processor 47 executes obtaining first information of identifying the user 100 based on the output of a first sensor. In other words, the display method according to the first embodiment includes obtaining the first information of identifying the user 100 based on the output of the first sensor. In the first embodiment, the user ID of the user 100 corresponds to the first information, and the microphone array 44 corresponds to the first sensor.

Further, in the display method according to the first embodiment, the microphone array 44 as the first sensor has at least one microphone, and obtaining the first information includes obtaining the voiceprint data of the user 100 based on the output of at least one microphone, and obtaining the identification information representing the user 100 as the first information based on the voiceprint data. In the first embodiment, the user ID of the user 100 corresponds to the identification information representing the user 100. It should be noted that since the user authentication technology with the voice is a generally known technology, the detailed description related to the step S1 will be omitted in the present embodiment.

Subsequently, the processor 47 determines (step S2) a sound source direction Ds based on the voice signals input from the microphone array 44. The sound source direction Ds means a direction at which a sound source is located with respect to the microphone array 44. It should be noted that since the user 100 is the sound source, the sound source direction Ds can be reworded as a direction in which the user 100 is located with respect to the microphone array 44.

When distances from the respective microphones included in the microphone array 44 to the sound source are different from each other, there occur time differences between times at which a sound wave reaches the respective microphones from the sound source. The differences occurring between the times at which the sound wave reaches the respective microphones from the sound source are hereinafter referred to as "sound-wave arrival time differences." A technology of determining or calculating the sound source direction Ds based on such sound-wave arrival time differences is generally known as a source localization technology. As an example, in the first embodiment, by using this source localization technology, the sound source direction Ds is determined.

In other words, in the step S2, the processor 47 calculates the sound-wave arrival time differences based on the voice signals output from the plurality of microphones included in the microphone array 44, and then determines the sound source direction Ds based on the sound-wave arrival time differences thus calculated. As described above, since the source localization technology is a generally known technology, the detailed description related to the step S2 will be omitted. For example, as shown in FIG. 5, when the user 100 is located at the west side of the display system 1, the processor 47 determines "west" as the sound source direction Ds. It should be noted that when determining a variety of directions as orientations, it is possible to use an orientation sensor not shown, and it is possible for the processor 47 to refer to information which is stored in advance in the memory 46, and which represents a correspondence relationship between the directions and the orientations with reference to the projector 10.

As described above, in the step S2, the processor 47 executes obtaining second information related to the position of the user 100 based on the output of a second sensor. In other words, the display method according to the first embodiment includes obtaining the second information related to the position of the user 100 based on the output of the second sensor. The second information includes information representing a second direction in which the user 100 is located with respect to the second sensor. In the first embodiment, the microphone array 44 corresponds to the second sensor, the sound source direction Ds, namely a direction in which the user 100 is located with respect to the microphone array 44, corresponds to the second direction, and the information representing the second direction corresponds to the second information. As described above, it is possible for the first sensor and the second sensor to be the same sensor, and it is also possible for the first sensor and the second sensor to be sensors different from each other.

Further, in the display method according to the first embodiment, the microphone array 44 as the second sensor has the plurality of microphones, and obtaining the second information includes calculating time differences between the times at which the sound wave reaches the respective microphones from the sound source, namely the sound-wave arrival time differences, based on the output of the plurality of microphones, and determining the sound source direction Ds as the second direction based on the time differences.

As shown in FIG. 4, the processor 47 executes the step S2 described above, and then determines (step S3) the first direction D1 based on the sound source direction Ds. Specifically, in the step S3, the processor 47 determines an opposite direction to the sound source direction Ds as the first direction D1. For example, as shown in FIG. 5, when the processor 47 has determined "west" as the sound source direction Ds, the processor 47 determines "east," which is an opposite direction to the sound source direction Ds, as the first direction D1.

As described above, in the step S3, the processor 47 executes determining the first direction D1 based on the information representing the sound source direction Ds as the second information. In other words, the display method according to the first embodiment includes determining the first direction D1 based on the second information. Determining the first direction D1 includes determining the opposite direction to the sound source direction Ds which is the second direction as the first direction D1.

As shown in FIG. 4, the processor 47 executes the step S3 described above, and then controls (step S4) the drive device 30 so that the projection direction Dp of the projector 10 is turned to the first direction D1. More specifically, in the step S4, the processor 47 controls the yaw angle θ of the first drive device 31 and the pitch angle α of the second drive device 32 so that the projection direction Dp of the projector 10 is turned to the first direction D1.

FIG. 6 is a diagram showing a condition in which the projection direction Dp of the projector 10 is turned to the first direction D1. For example, as described with reference to FIG. 5, when the processor 47 determines "east" as the first direction D1 in the state in which the projection direction Dp of the projector 10 is set in the southward direction, the processor 47 controls the drive device 30 so that the projection direction Dp of the projector 10 is turned from south to east. As a result, as shown in FIG. 6, by the projector 10 rotating 90 degrees counterclockwise centering on the yaw axis Y, the projection direction Dp of the projector 10 is turned to east.

As shown in FIG. 4, the processor 47 executes the step S4 described above, and then determines (step S5) a projection content based on a combination of the user ID of the user 100 and the sound source direction Ds. The projection content means a video content which is projected as the image light L from the projector 10 to thereby be provided to the user 100. The video content means an image product or a broadcast program belonging to a video genre such as movie, TV drama, animation, weather, politics, economy, or sport.

Specifically, in the step S5, the processor 47 determines the projection content based on the combination of the user ID of the user 100 and the sound source direction Ds, and a first content selection table stored in advance in the memory 46. FIG. 7 is a diagram showing an example of the first content selection table. As shown in FIG. 7, the first content selection table is data representing correspondence relationships between combinations of the user IDs and the sound source directions Ds, and the video genres.

For example, in the first content selection table, the combination of the user ID corresponding to "user A" and the sound source direction Ds corresponding to "west" is associated with "movie" as the video genre. Further, in the first content selection table, the combination of the user ID corresponding to "user B" and the sound source direction Ds corresponding to "east" is associated with "weather" as the video genre. Further, in the first content selection table, the combination of the user ID corresponding to "user C" and the sound source direction Ds corresponding to "south" is associated with "animation" as the video genre.

In the step S5, the processor 47 first selects the video genre corresponding to the combination of the user ID of the user 100 and the sound source direction Ds from the video genres included in the first content selection table. For example, when "user A" is obtained as the user ID of the user 100 in the step S1, and "west" is determined as the sound source direction Ds in the step S2, the processor 47 selects "movie" from the video genres included in the first content selection table.

For example, the processor 47 selects the video genre, and then communicates with the video content delivery server via the communication device 43 to thereby obtain a delivery list of the video contents belonging to the video genre thus selected from the video content delivery server. The processor 47 generates the delivery list image including the delivery list, and a message of requiring the user 100 to perform an operation of selecting the video content from the delivery list. The processor 47 controls the optical device 41 so that the image light L representing the delivery list image is projected.

FIG. 8 is a diagram showing a condition in which the image light L is projected toward the first direction D1. For example, as shown in FIG. 8, when the processor 47 controls the optical device 41 so that the image light L representing the delivery list image is projected in the state in which the projection direction Dp of the projector 10 is turned to east as an example of the first direction D1, the image light L is projected eastward from the projector 10. As a result, the delivery list image is displayed on an east side wall surface 230 located at the east side, namely a front direction side of the user 100 out of the wall surfaces of the room 200.

For example, the user 100 performs the operation of selecting the video content from the delivery list using the remote controller while looking at the delivery list image displayed on the east side wall surface 230. When the processor 47 determines that the operation of selecting the video content from the delivery list has been received based on a remote operation signal input from the light receiver 42*b* during a period in which the delivery list image is displayed, the processor 47 determines the video content selected by the user 100 as the projection content.

Alternatively, it is possible for the processor 47 to determine the projection content by executing the following processing. For example, when the video signals of a plurality of video contents belonging to each of the video genres are stored in advance in the memory 46, the projector 47 generates an archive list of the video contents belonging to the video genre thus selected. The processor 47 generates an archive list image including the archive list, and a message of requiring the user 100 to perform an operation of selecting the video content from the archive list. The processor 47 controls the optical device 41 so that the image light L representing the archive list image is projected.

For example, the user 100 performs the operation of selecting the video content from the archive list using the remote controller while looking at the archive list image displayed. When the processor 47 determines that the operation of selecting the video content from the archive list has been received based on the remote operation signal input from the light receiver 42*b* during a period in which the archive list image is displayed, the processor 47 determines the video content selected by the user 100 as the projection content.

As described above, in the step S5, the processor 47 executes determining a type of the image based on a combination of the first information and the second information. In other words, the display method according to the first embodiment includes determining the type of the image based on the combination of the first information and the second information. In the first embodiment, the user ID of the user 100 corresponds to the first information, the information representing the sound source direction Ds corresponds to the second information, and the projection content corresponds to the type of the image. In other words, the type of the image means the video content such as the image product or the broadcast program classified according to the video genre.

As shown in FIG. 4, the processor 47 executes the step S5 described above, and then controls (step S6) the optical device 41 so that the image light L representing the image of the projection content is projected. Specifically, in the step S6, the processor 47 receives the video signal of the video content determined as the projection content from the video content delivery server via the communication device 43, or retrieves that video signal from the memory 46. Then, the processor 47 controls the optical device 41 so that the image light L representing the image based on the image data included in the video signal is projected, and controls the speaker 45 so that the sound based on the audio data included in the video signal is output.

For example, as shown in FIG. 8, when the processor 47 controls the optical device 41 so that the image light L representing the image of the projection content is projected in the state in which the projection direction Dp of the projector 10 is turned to east as an example of the first direction D1, the image light L is projected eastward from the projector 10. As a result, the image of the video content determined as the projection content is displayed on the east side wall surface 230 located at the front direction side of the user 100 out of the wall surfaces of the room 200.

As described above, in the steps S4 and S6, the processor 47 controls the optical device 41 and the drive device 30 to thereby execute projecting the image light L representing the image of the projection content as the image of the determined type toward the first direction D1. In other words, the display method according to the first embodiment includes projecting the image light L representing the image of the determined type toward the first direction D1 with the projector 10.

Advantages of First Embodiment

As described above, the display method according to the first embodiment includes obtaining the user ID as the first information for identifying the user 100 based on the output of the microphone array 44 as the first sensor, obtaining the information representing the sound source direction Ds as the second information related to the position of the user 100 based on the output of the microphone array 44 as the second sensor, determining the first direction D1 based on the second information, determining the projection content as the type of the image based on the combination of the first information and the second information, and projecting the image light L representing the image of the projection content as the image of the determined type toward the first direction D1 with the projector 10.

The video content demanded by the user 100 is different not only by an individual attribute such as the age, the gender, a job, or a hobby but also by the position of the user 100 in some cases. In the display method according to the first embodiment, the projection content is determined based on the first information of identifying the user 100 and the second information related to the position of the user 100, and the image light L representing the image of the projection content is projected toward the first direction D1 determined based on the second information.

Thus, there is increased the possibility that the image of the video content suitable for the individual attribute and the position of the user 100 is displayed on the projection surface which is easy for the user 100 to visually recognize. Therefore, according to the display method in the first embodiment, it is possible to enhance the convenience of the user 100 when using the projector 10 the projection direction Dp of which is variable.

In the display method according to the first embodiment, the second information includes the information representing the sound source direction Ds as the second direction in which the user 100 is located with respect to the microphone array 44 as the second sensor, and determining the first direction D1 includes determining the opposite direction to the sound source direction Ds which is the second direction as the first direction D1.

As described above, by determining the opposite direction to the second direction in which the user 100 is located with respect to the second sensor as the first direction D1, it is possible to display the image of the projection content on the projection surface which is located at the front direction side of the user 100, namely the projection surface which is easy for the user 100 to visually recognize, and therefore, the convenience of the user 100 is enhanced.

In the display method according to the first embodiment, determining the projection content as the type of the image includes determining the projection content as the type of the image based on the combination of the user ID as the first information and the sound source direction Ds as the second direction.

As described above, by determining the projection content based on the combination of the user ID as the first information and the sound source direction Ds as the second direction, it is possible to display the image of the video content suitable for the combination of the individual attribute of the user 100 and the second direction in which the user 100 is located on the projection surface located at the front direction side of the user 100, and therefore, the convenience of the user 100 is enhanced.

In the display method according to the first embodiment, the microphone array 44 as the second sensor has the plurality of microphones, and obtaining the second information includes calculating the time differences between the times at which the sound wave reaches the respective microphones from the sound source based on the output of the plurality of microphones, and determining the sound source direction Ds as the second direction based on the time differences.

As described above, by calculating the time differences between the times at which the sound wave reaches the respective microphones from the sound source based on the output of the respective microphones, it is possible to accurately obtain the sound source direction Ds as the direction in which the sound source is located with respect to the second sensor as the second direction in which the user 100 is located.

In the display method according to the first embodiment, the microphone array 44 as the first sensor has at least one microphone, and obtaining the first information includes obtaining the voiceprint data of the user 100 based on the output of at least one microphone, and obtaining user ID as the identification information representing the user 100 as the first information based on the voiceprint data.

As described above, by obtaining the voiceprint data as biological data unique to the user 100 based on the output of at least one microphone, it is possible to accurately obtain the user ID of the user 100 as the first information. Further, as in the first embodiment, since the first sensor and the second sensor are the same sensor, namely the microphone array 44, it is possible to obtain both of the first information and the second information based on the output of that single sensor.

The display system 1 according to the first embodiment is provided with the microphone array 44 as the first sensor, the microphone array 44 as the second sensor, the optical device 41 for projecting the image light L, the drive device 30 for turning the direction in which the image light L is projected to the predetermined direction, and the processor 47. The processor 47 executes obtaining the user ID as the first information for identifying the user 100 based on the output of the first sensor, obtaining the information representing the sound source direction Ds as the second information related to the position of the user 100 based on the output of the second sensor, determining the first direction D1 based on the second information, determining the projection content as the type of the image based on the combination of the first information and the second information, and projecting the image light L representing the image of the projection content as the image of the determined type toward the first direction D1 by controlling the optical device 41 and the drive device 30.

In the display system 1 according to the first embodiment, the projection content is determined based on the first information of identifying the user 100 and the second information related to the position of the user 100, and the image light L representing the image of the projection content is projected toward the first direction D1 determined based on the second information.

Thus, there is increased the possibility that the image of the video content suitable for the individual attribute and the position of the user 100 is displayed on the projection surface which is easy for the user 100 to visually recognize. Therefore, according to the display system 1 in the first embodiment, it is possible to enhance the convenience of the user 100 when using the projector 10 the projection direction Dp of which is variable.

Second Embodiment

A second embodiment of the present disclosure will hereinafter be described. In each of the aspects illustrated hereinafter, constituents common to those of the first embodiment are denoted by the same reference symbols as those used in the first embodiment, and the detailed description thereof will arbitrarily be omitted.

Figure 9:
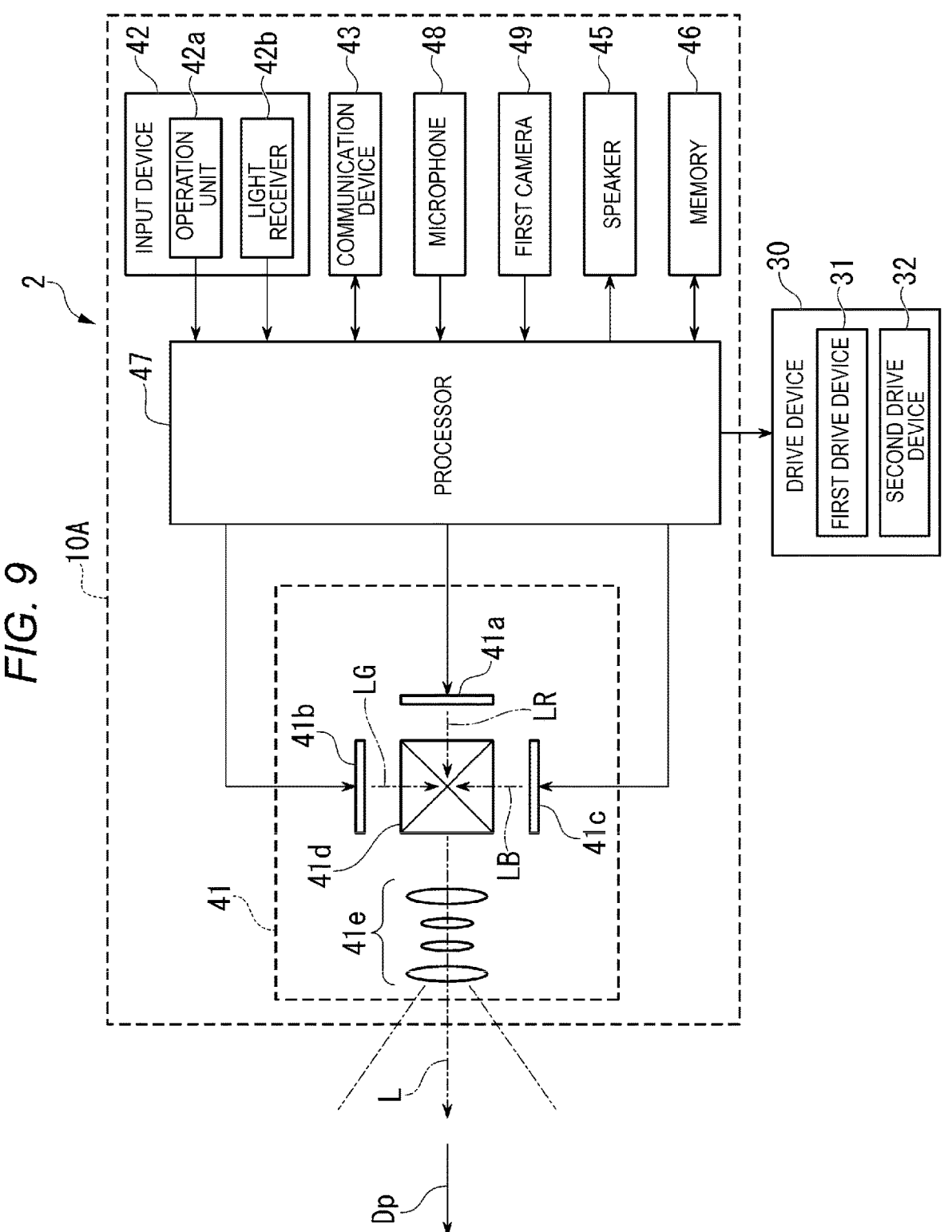
FIG. 9 is a block diagram showing a functional configuration of a display system according to a second embodiment.

FIG. 9 is a block diagram schematically showing a functional configuration of a display system 2 according to the second embodiment. As shown in FIG. 9, the display system 2 is provided with a projector 10A and the drive device 30 as constituents having respective functions. The projector 10A according to the second embodiment coincides with the projector 10 according to the first embodiment in the point that there are provided the optical device 41, the input device 42, the communication device 43, the speaker 45, the memory 46, and the processor 47.

The projector 10A is different from the projector 10 in the point that a microphone 48 is provided as the first sensor instead of the microphone array 44. Further, the projector 10A is different from the projector 10 in the point that a first camera 49 is provided as the second sensor. The difference between the second embodiment and the first embodiment will hereinafter be described in detail.

The microphone 48 converts the voice of the user 100 into an electric signal, and then outputs the electric signal to the processor 47 as the voice signal. The first camera 49 is a digital camera for taking an image in one direction. The first camera 49 is attached to the projector 10A so as to take an image in the projection direction Dp. In other words, the first camera 49 is attached to the projector 10A so that the imaging direction of the first camera 49 coincides with the projection direction Dp. The first camera 49 outputs taken image data representing a taken image to the processor 47.

Then, an operation of the display system 2 configured as described above will be described.

FIG. 10 is a flowchart showing second display processing to be executed by the processor 47 in the second embodiment. When the voice signal is input to the processor 47 from the microphone 48 in a period in which the processor 47 operates in the voice standby mode, the processor 47 retrieves the program from the memory 46 and then executes the program to thereby execute the second display processing shown in FIG. 10. By the processor 47 executing the second display processing, a display method according to the second embodiment is realized.

Figure 11:
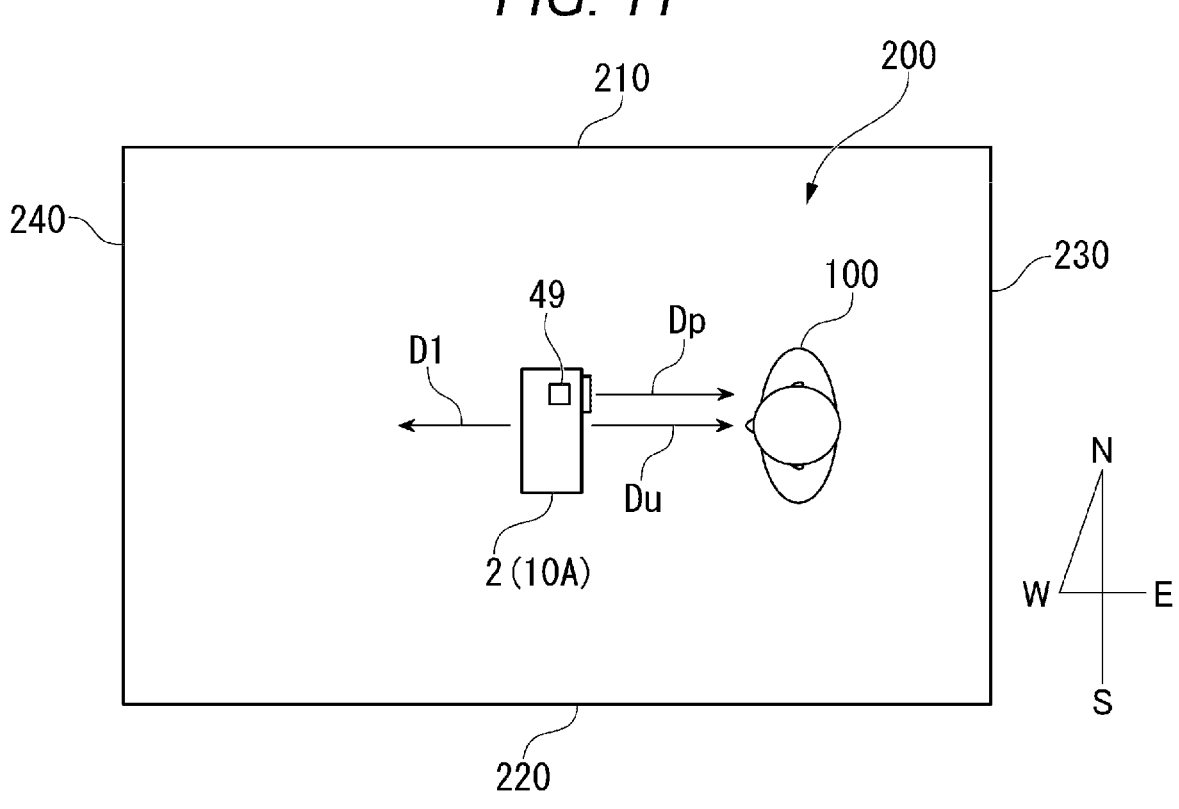
FIG. 11 is a plan view showing an installation example of the display system.

FIG. 11 is a plan view showing an installation example of the display system 2. In the example shown in FIG. 11, the display system 2 is installed at the center in the room 200 disposed at home of the user 100 similarly to the example shown in FIG. 5. In the following description, as shown in FIG. 11, it is assumed that the processor 47 operates in the voice standby mode in a state in which the projection direction Dp of the projector 10A is an eastward direction, and at the same time, the user 100 is located at the east side of the display system 2. In this case, the first camera 49 takes an image in the eastward direction as the same direction as the projection direction Dp.

When the user 100 utters in the situation shown in FIG. 11, the voice signal is output to the processor 47 from the microphone 48. When the voice signal is input to the processor 47 from the microphone 48 in the period in which the processor 47 operates in the voice standby mode, the processor 47 starts the second display processing shown in FIG. 10.

As shown in FIG. 10, when the processor 47 starts the second display processing, the processor 47 first performs (step S11) the user authentication based on the voice signal input from the microphone 48 and the user information stored in advance in the memory 46. The step S11 includes the steps S11$a$, S11$b$, S11$c$, and S11$d$. Since the processing in the step S11 in the second display processing is substantially the same as the processing in the step S1 in the first display processing, the processing in the step S11 will hereinafter be briefly described.

In the step S11, the processor 47 first performs the frequency analysis on the voice signal output from microphone 48 to thereby obtain (step S11$a$) the voiceprint data of the user 100. The processor 47 determines (step S11$b$) whether or not the registered voiceprint data coinciding with the voiceprint data of the user 100 is present in the user information. When the registered voiceprint data coinciding with the voiceprint data of the user 100 is present in the user information (Yes in the step S11$b$), the processor 47 obtains (step S11$c$) the user ID associated with the registered voiceprint data coinciding with the voiceprint data of the user 100 out of the user IDs included in the user information as the user ID of the user 100.

On the other hand, when the registered voiceprint data coinciding with the voiceprint data of the user 100 is not present in the user information (No in the step S11$b$), the processor 47 controls (step S11$d$) the speaker 45 so as to output a sound of notifying the user 100 of the fact that the user authentication has failed. After the processor 47 executes the step S11$d$, the processor 47 terminates the second display processing to return to the voice standby mode.

As described above, in the step S11, the processor 47 executes obtaining the first information of identifying the user 100 based on the output of the first sensor. In other words, the display method according to the second embodiment includes obtaining the first information of identifying the user 100 based on the output of the first sensor. In the second embodiment, the user ID corresponds to the first information, and the microphone 48 corresponds to the first sensor.

Further, in the display method according to the second embodiment, the first sensor has at least one microphone 48, and obtaining the first information includes obtaining the voiceprint data of the user 100 based on the output of at least one microphone 48, and obtaining the user ID which is the identification information representing the user 100 as the first information based on the voiceprint data.

Subsequently, the processor 47 determines (step S12) a user direction Du based on the taken image data input from the first camera 49. The user direction Du means a direction in which the user 100 is located with respect to the first camera 49. For example, as shown in FIG. 11, when the first camera 49 takes the image in the eastward direction as the projection direction Dp in the state in which the user 100 is located at the east side of the display system 2, the taken image data representing the taken image in which the user 100 shows up is output from the first camera 49 to the processor 47.

The user information in the second embodiment includes facial identification information associated with the user ID in addition to the user ID of the registered user, and the registered voiceprint data. The facial identification information is information for identifying a face of the registered user. In the step S12, the processor 47 obtains the facial identification information associated with the user ID of the user 100 out of the facial identification information included in the user information. Then, the processor 47 performs an image analysis of the taken image based on the taken image data and the facial identification information to thereby determine an image area corresponding to the face of the user 100 out of an image area included in the taken image as a user image area.

In the second embodiment, a coordinate conversion formula for converting the coordinate in the image coordinate system of the taken image into a coordinate in a coordinate system representing a movable range of the projection direction Dp is stored in advance in the memory 46. The coordinate system representing the movable range of the projection direction Dp is a coordinate system defined by the yaw angle θ and the pitch angle α. In the step S12, the processor 47 converts the central coordinate of the user image area in the image coordinate system into the coordinate defined by the yaw angle θ and the pitch angle α based on this coordinate conversion formula. The coordinate obtained by such coordinate conversion represents the direction in which the user 100 is located with respect to the first camera 49. In other words, the processor 47 obtains the direction corresponding to the coordinate obtained by the coordinate conversion as the user direction Du. For example, the processor 47 obtains the orientation corresponding to the coordinate as the user direction Du with reference to the table representing the correspondence relationship between the orientations stored in advance in the memory 46 and the coordinate system representing the movable range of the projection direction Dp. As shown in FIG. 11, when the user 100 is located at the east side of the display system 2, the processor 47 obtains "east" corresponding to the coordinate as the user direction Du. It should be noted that it is possible for the processor 47 to obtain the coordinate itself in the coordinate system representing the movable range of the projection direction Dp as the user direction Du.

As described above, in the step S12, the processor 47 executes obtaining the second information related to the position of the user 100 based on the output of the second sensor. In other words, the display method according to the second embodiment includes obtaining the second information related to the position of the user 100 based on the output of the second sensor. The second information includes information representing the second direction in which the user 100 is located with respect to the second sensor. In the second embodiment, the first camera 49 corresponds to the second sensor, the user direction Du, namely a direction in which the user 100 is located with respect to the first camera 49, corresponds to the second direction, and the information representing the second direction corresponds to the second information.

Further, in the display method according to the second embodiment, obtaining the second information includes obtaining the first image including the user 100 based on the output of the first camera 49, and determining the user direction Du as the second direction based on the first image.

As described above, out of the taken image obtained from the first camera 49, the taken image in which the user 100 shows up corresponds to the first image.

It should be noted that when the user image area is not present in the taken image obtained when starting the step S12, it is conceivable that the user 100 is not present in the projection direction Dp as the imaging direction of the first camera 49. Therefore, when the user image area is not present in the taken image obtained when starting the step S12, the processor 47 obtains the taken image data from the first camera 49 at predetermined time intervals while controlling the drive device 30 so that the projector 10A makes one revolution around the yaw axis Y. Further, the processor 47 determines whether or not the user image area is present in the taken image every time the processor 47 obtains the taken image data. When the processor 47 determines that the user image area is present in the taken image, the processor 47 stops the control of the drive device 30 and executes the coordinate conversion described above to thereby determine the user direction Du.

As shown in FIG. 10, the processor 47 executes the step S12 described above, and then determines (step S13) the first direction D1 based on the user direction Du. Specifically, in the step S13, the processor 47 determines an opposite direction to the user direction Du as the first direction D1. For example, as shown in FIG. 11, when the processor 47 has determined "east" as the user direction Du, the processor 47 determines "west," which is an opposite direction to the user direction Du, as the first direction D1.

As described above, in the step S13, the processor 47 executes determining the first direction D1 based on the information representing the user direction Du as the second information. In other words, the display method according to the second embodiment includes determining the first direction D1 based on the information representing the user direction Du as the second information. Determining the first direction D1 includes determining the opposite direction to the user direction Du which is the second direction as the first direction D1.

As shown in FIG. 10, the processor 47 executes the step S13 described above, and then controls (step S14) the drive device 30 so that the projection direction Dp of the projector 10A is turned to the first direction D1. More specifically, in the step S14, the processor 47 controls the yaw angle θ of the first drive device 31 and the pitch angle α of the second drive device 32 so that the projection direction Dp of the projector 10A is turned to the first direction D1. Thus, the imaging direction of the first camera 49 is also turned to the first direction D1.

Figure 12:
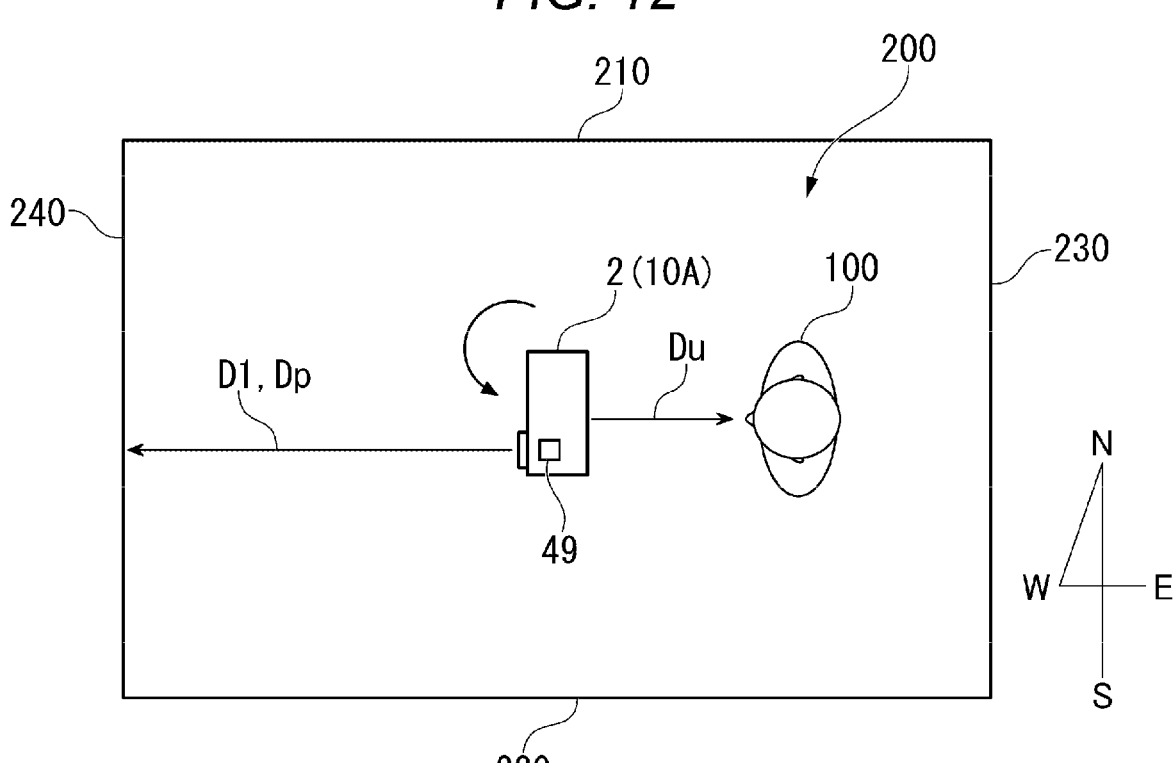
FIG. 12 is a diagram showing a condition in which the projection direction is turned to the first direction.

FIG. 12 is a diagram showing a condition in which the projection direction Dp of the projector 10A is turned to the first direction D1. For example, as described with reference to FIG. 11, when the processor 47 determines "west" as the first direction D1 in the state in which the projection direction Dp of the projector 10A is set in the eastward direction, the processor 47 controls the drive device 30 so that the projection direction Dp of the projector 10A is turned from east to west. As a result, as shown in FIG. 12, by the projector 10A rotating 180 degrees counterclockwise centering on the yaw axis Y, the projection direction Dp of the projector 10A is turned to west. In this case, the imaging direction of the first camera 49 is also turned to west.

As shown in FIG. 10, the processor 47 executes the step S14 described above, and then determines (step S15) a viewing place based on the taken image data input from the first camera 49. The viewing place means a place where the user 100 is located.

For example, as shown in FIG. 12, when the first camera 49 takes the image in the first direction D1 in the state in which the projection direction Dp is turned to "west" as the first direction D1, the taken image data representing the taken image in which an area located at the first direction D1 side out of the area in the room 200, namely an area at the west side including the west side wall surface 240, shows up is output from the first camera 49 to the processor 47.

In the step S15, the processor 47 determines one of a plurality of viewing place candidates as the viewing place based on the taken image data. For example, in the plurality of viewing place candidates, there are included rooms such as a living room, a bedroom, and a washroom. In the memory 46, as reference image data, there is stored in advance image data obtained by imaging the inside of the rooms as the viewing place candidates using the first camera 49.

Specifically, in the step S15, the processor 47 calculates the similarity between the taken image represented by the taken image data and a reference image represented by the reference image data using image processing such as pattern matching. The reference image is an image obtained by imaging the inside of the room as the viewing place candidate using the first camera 49 as described above. Further, the processor 47 determines the viewing place candidate where the reference image the highest in similarity to the taken image is obtained out of the plurality of viewing place candidates as the viewing place.

As described above, in the display method according to the second embodiment, the second information related to the position of the user 100 further includes information representing the viewing place as a place where the user 100 is located in addition to the information representing the user direction Du as the second direction in which the user 100 is located. Further, in the display method according to the second embodiment, obtaining the second information includes obtaining a second image including an area located in the first direction D1 based on the output of the first camera 49, and determining the viewing place based on the second image. As described above, out of the taken image obtained from the first camera 49, the taken image obtained by taking the image in the first direction D1 corresponds to the second image.

As shown in FIG. 10, the processor 47 executes the step S15 described above, and then determines (step S16) the projection content based on a combination of the user ID of the user 100 and the viewing place. Specifically, in the step S16, the processor 47 determines the projection content based on the combination of the user ID of the user 100 and the viewing place, and a second content selection table stored in advance in the memory 46. FIG. 13 is a diagram showing an example of the second content selection table. As shown in FIG. 13, the second content selection table is data representing correspondence relationships between combinations of the user IDs and the viewing places, and the video genres.

For example, in the second content selection table, the combination of the user ID corresponding to "user A" and the viewing place corresponding to "living room" is associated with "movie" as the video genre. Further, in the second content selection table, the combination of the user ID corresponding to "user B" and the viewing place corresponding to "bedroom" is associated with "cosmetics" as the video genre. Further, in the second content selection table, the combination of the user ID corresponding to "user C" and the viewing place corresponding to "washroom" is associated with "animation" as the video genre.

In the step S16, the processor 47 first selects the video genre corresponding to the combination of the user ID of the user 100 and the viewing place from the video genres included in the second content selection table. For example, when "user A" is obtained as the user ID of the user 100 in the step S11, and "living room" is determined as the viewing place in the step S15, the processor 47 selects "movie" from the video genres included in the second content selection table. The processor 47 performs the same processing as the processing described in the first embodiment after selecting the video genre to thereby determine the projection content.

As described above, in the step S16, the processor 47 executes determining the projection content as a type of the image based on a combination of the user ID as the first information and the information representing the viewing place as the second information. In other words, the display method according to the second embodiment includes determining the projection content as a type of the image based on the combination of the user ID as the first information and the information representing the viewing place as the second information. Further, the second information includes the information representing the viewing place as a place where the user is located, and determining the projection content as the type of the image includes determining the projection content as the type of the image based on the combination of the user ID as the first information and the viewing place.

As shown in FIG. 10, the processor 47 executes the step S16 described above, and then controls (step S17) the optical device 41 so that the image light L representing the image of the projection content is projected. Since the processing in the step S17 in the second display processing is the same as the processing in the step S6 in the first display processing, the description related to the step S17 will be omitted.

FIG. 14 is a diagram showing a condition in which the image light L is projected toward the first direction D1. For example, as shown in FIG. 14, when the processor 47 controls the optical device 41 so that the image light L representing the projection content is projected in the state in which the projection direction Dp of the projector is turned to west as an example of the first direction D1, the image light L is projected westward from the projector 10A. As a result, the image of the video content determined as the projection content is displayed on the west side wall surface 240 located at the front direction side of the user 100 out of the wall surfaces of the room 200.

As described above, in the steps S14 and S17, the processor 47 controls the optical device 41 and the drive device 30 to thereby execute projecting the image light L representing the image of the projection content as the image of the determined type toward the first direction D1. In other words, the display method according to the second embodiment includes projecting the image light L representing the image of the projection content as the image of the determined type toward the first direction D1 with the projector 10A.

Advantages of Second Embodiment

As described above, the display method according to the second embodiment includes obtaining the user ID as the first information for identifying the user 100 based on the output of the microphone 48 as the first sensor, obtaining the information representing the user direction Du and the viewing place as the second information related to the position of the user 100 based on the output of the first camera 49 as the second sensor, determining the first direction D1 based on the information representing the user direction Du as the second information, determining the projection content as the type of the image based on the combination of the first information and the information representing the viewing place as the second information, and projecting the image light L representing the image of the projection content as the image of the determined type toward the first direction D1 with the projector 10A.

In the display method according to the second embodiment, similarly to the first embodiment, the projection content is determined based on the first information of identifying the user 100 and the second information related to the position of the user 100, and the image light L representing the image of the projection content is projected toward the first direction D1 determined based on the second information.

Thus, there is increased the possibility that the image of the video content suitable for the individual attribute and the position of the user 100 is displayed on the projection surface which is easy for the user 100 to visually recognize. Therefore, according to the display method in the second embodiment, it is possible to enhance the convenience of the user 100 when using the projector the projection direction Dp of which is variable.

In the display method according to the second embodiment, the second information includes the information representing the user direction Du as the second direction in which the user 100 is located with respect to the first camera 49 as the second sensor, and determining the first direction D1 includes determining the opposite direction to the user direction Du which is the second direction as the first direction D1.

As described above, by determining the opposite direction to the second direction in which the user 100 is located with respect to the second sensor as the first direction D1, it is possible to display the image of the projection content on the projection surface which is located at the front direction side of the user 100, namely the projection surface which is easy for the user 100 to visually recognize, and therefore, the convenience of the user 100 is enhanced.

In the display method according to the second embodiment, the second information further includes the information representing the viewing place as a place where the user 100 is located, and determining the projection content as the type of the image includes determining the projection content as the type of the image based on the combination of the user ID as the first information and the viewing place.

In the first embodiment, the projection content is determined based on the combination of the user ID as the first information and the sound source direction Ds. Since the sound source direction Ds is consistently a direction in which the user 100 is located with respect to the second sensor, it is difficult to determine the place where the user 100 is located, namely the room or the like to be the viewing place, from the sound source direction Ds.

Therefore, as described above, by determining the projection content based on the combination of the user ID as the first information and the viewing place, it is possible to display the image of the video content which is suitable for the individual attribute of the user 100 and the viewing place on the projection surface, and therefore, the convenience of the user 100 is further enhanced compared to the first embodiment.

In the display method according to the second embodiment, the second sensor is the first camera 49 for taking an image in one direction, obtaining the second information includes obtaining the first image including the user 100 based on the output of the first camera 49, determining the user direction Du as the second direction based on the first image, obtaining the second image including the area located in the first direction D1 based on the output of the first camera 49, and determining the viewing place based on the second image.

As described above, by determining both of the user direction Du and the viewing place based on the first image and the second image obtained from the first camera 49, it is possible to accurately obtain the second information related to the position of the user 100 using a single camera.

In the display method according to the second embodiment, the first sensor has at least one microphone 48, and obtaining the first information includes obtaining the voiceprint data of the user 100 based on the output of at least one microphone 48, and obtaining the user ID which is the identification information representing the user 100 as the first information based on the voiceprint data.

As described above, by obtaining the voiceprint data as biological data unique to the user 100 based on the output of at least one microphone 48, it is possible to accurately obtain the user ID of the user 100 as the first information.

The display system 2 according to the second embodiment is provided with the microphone 48 as the first sensor, the first camera 49 as the second sensor, the optical device 41 for projecting the image light L, the drive device 30 for turning the direction in which the image light L is projected to the predetermined direction, and the processor 47. The processor 47 executes obtaining the user ID as the first information for identifying the user 100 based on the output of the first sensor, obtaining the information representing the user direction Du as the second information related to the position of the user 100 based on the output of the second sensor, determining the first direction D1 based on the information representing the user direction Du as the second information, determining the projection content as the type of the image based on the combination of the first information and the information representing the viewing place as the second information, and projecting the image light L representing the image of the projection content as the image of the determined type toward the first direction D1 by controlling the optical device 41 and the drive device 30.

In the display system 2 according to the second embodiment, the projection content is determined based on the first information of identifying the user 100 and the information representing the viewing place as the second information related to the position of the user 100, and the image light L representing the image of the projection content is projected toward the first direction D1 determined based on the information representing the user direction Du as the second information.

Thus, there is increased the possibility that the image of the video content suitable for the individual attribute and the position of the user 100 is displayed on the projection surface which is easy for the user 100 to visually recognize. Therefore, according to the display system 2 in the second embodiment, it is possible to enhance the convenience of the user 100 when using the projector 10A the projection direction Dp of which is variable.

Third Embodiment

A third embodiment of the present disclosure will hereinafter be described.

Figure 15:
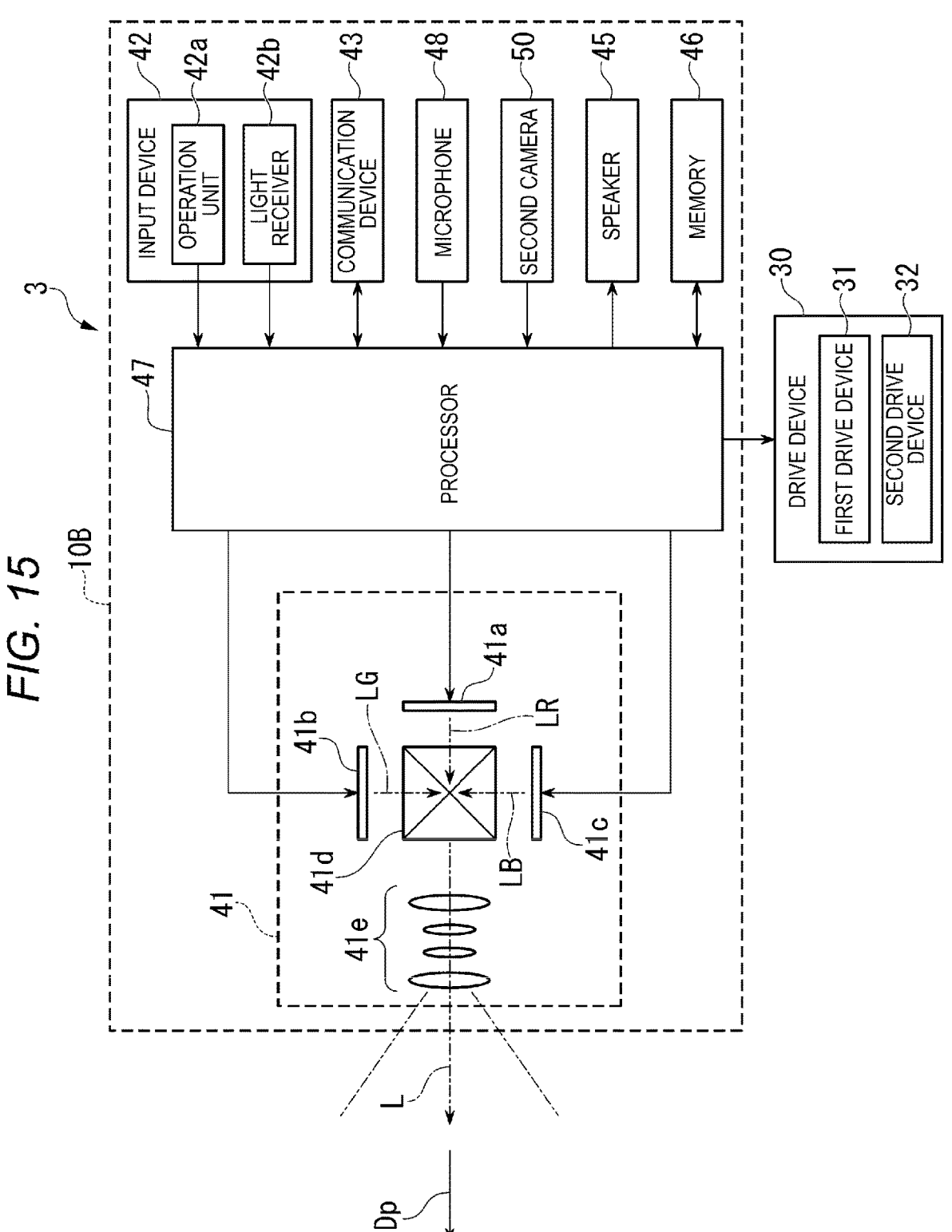
FIG. 15 is a block diagram showing a functional configuration of a display system according to a third embodiment.

FIG. 15 is a block diagram schematically showing a functional configuration of a display system 3 according to the third embodiment. As shown in FIG. 15, the display system 3 is provided with a projector 10B and the drive device 30 as constituents having respective functions. The projector 10B according to the third embodiment coincides with the projector 10A according to the second embodiment in the point that there are provided the optical device 41, the input device 42, the communication device 43, the speaker 45, the memory 46, the processor 47, and the microphone 48.

The projector 10B is different from the projector in the point that a second camera 50 is provided as the second sensor instead of the first camera 49. The difference between the third embodiment and the second embodiment will hereinafter be described in detail.

The second camera 50 is a digital camera for taking an image in a 360-degree direction centering on the second camera 50. For example, the second camera 50 is attached on an upper surface of a chassis of the projector The second camera 50 outputs taken image data representing a taken image to the processor 47.

Then, an operation of the display system 3 configured as described above will be described.

FIG. 16 is a flowchart showing third display processing to be executed by the processor 47 in the third embodiment. When the voice signal is input to the processor 47 from the microphone 48 in a period in which the processor 47 operates in the voice standby mode, the processor 47 retrieves the program from the memory 46 and then executes the program to thereby execute the third display processing shown in FIG. 16. By the processor 47 executing the third display processing, a display method according to the third embodiment is realized.

Figures 17, 18:
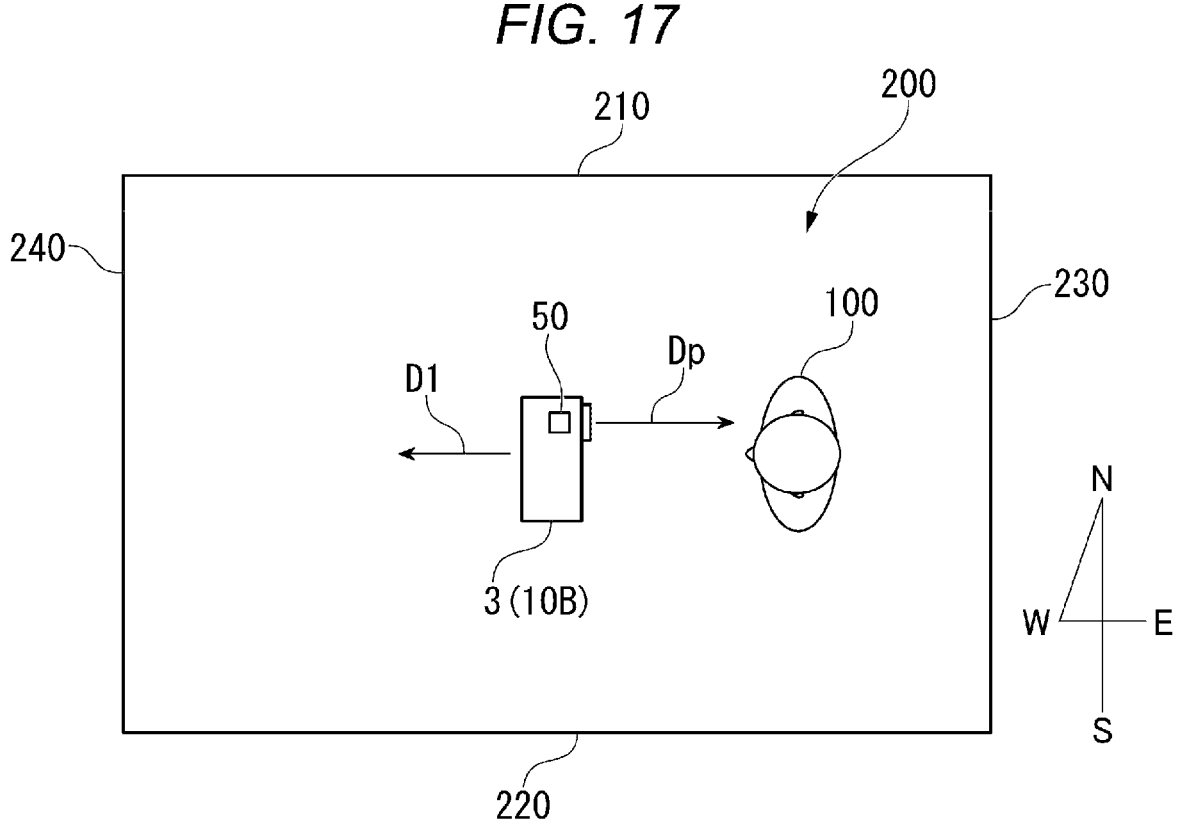
FIG. 17 is a plan view showing an installation example of the display system.
FIG. 18 is a diagram showing an example of a direction setting table.

FIG. 17 is a plan view showing an installation example of the display system 3. In the example shown in FIG. 17, the display system 3 is installed at the center in the room 200 disposed at home of the user 100 similarly to the example shown in FIG. 5. In the following description, as shown in FIG. 17, it is assumed that the processor 47 operates in the voice standby mode in a state in which the projection direction Dp of the projector 10B is the eastward direction, and at the same time, the user 100 is located at the east side of the display system 3. The second camera 50 takes an image in a 360-degree direction centering on the second camera 50.

When the user 100 utters in the situation shown in FIG. 17, the voice signal is output to the processor 47 from the microphone 48. When the voice signal is input to the processor 47 from the microphone 48 in the period in which the processor 47 operates in the voice standby mode, the processor 47 starts the third display processing shown in FIG. 16.

As shown in FIG. 16, when the processor 47 starts the third display processing, the processor 47 first performs (step S21) the user authentication based on the voice signal input from the microphone 48 and the user information stored in advance in the memory 46. The step S21 includes the steps S21*a*, S21*b*, S21*c*, and S21*d*. Since the processing in the step S21 in the third display processing is the same as the processing in the step S11 in the second display processing, the processing in the step S21 will hereinafter be briefly described.

In the step S21, the processor 47 first performs frequency analysis on the voice signal output from the microphone 48 to thereby obtain (step S21*a*) the voiceprint data of the user 100. The processor 47 determines (step S21*b*) whether or not the registered voiceprint data coinciding with the voiceprint data of the user 100 is present in the user information. When the registered voiceprint data coinciding with the voiceprint data of the user 100 is present in the user information (Yes in the step S21*b*), the processor 47 obtains (step S21*c*) the user ID associated with the registered voiceprint data coinciding with the voiceprint data of the user 100 out of the user IDs included in the user information as the user ID of the user 100.

On the other hand, when the registered voiceprint data coinciding with the voiceprint data of the user 100 is not present in the user information (No in the step S21*b*), the processor 47 controls (step S21*d*) the speaker so as to output a sound of notifying the user 100 of the fact that the user authentication has failed. After the processor 47 executes the step S21*d*, the processor 47 terminates the third display processing to return to the voice standby mode.

As described above, in the step S21, the processor 47 executes obtaining the first information of identifying the user 100 based on the output of the first sensor. In other words, the display method according to the third embodiment includes obtaining the first information of identifying the user 100 based on the output of the first sensor. In the third embodiment, the user ID corresponds to the first information, and the microphone 48 corresponds to the first sensor.

Subsequently, the processor 47 determines (step S22) the viewing place based on the taken image data input from the second camera 50. Similarly to the second embodiment, the viewing place means a place where the user 100 is located.

For example, as shown in FIG. 17, when the second camera 50 takes the image in the 360-degree direction in the state in which the display system 3 is installed at the center of the room 200, the taken image data representing the taken image in which an area included in a 360-degree range centering on the second camera 50 out of the area in the room 200 shows up is output from the second camera 50 to the processor 47.

In the step S22, the processor 47 determines one of the plurality of viewing place candidates as the viewing place based on the taken image data. For example, in the plurality of viewing place candidates, there are included rooms such as a living room, a bedroom, and a washroom. In the memory 46, as the reference image data, there is stored in advance image data obtained by imaging the inside of the rooms as the viewing place candidates using the second camera 50.

Specifically, in the step S22, the processor 47 calculates the similarity between the taken image represented by the taken image data and the reference image represented by the reference image data using the image processing such as pattern matching. The reference image is an image obtained by imaging the inside of the room as the viewing place candidate using the second camera 50 as described above. Further, the processor 47 determines the viewing place candidate where the taken image the highest in similarity to the reference image is obtained out of the plurality of viewing place candidates as the viewing place.

As described above, in the step S22, the processor 47 executes obtaining the second information related to the position of the user 100 based on the output of the second sensor. In other words, the display method according to the third embodiment includes obtaining the second information related to the position of the user 100 based on the output of the second sensor. The second information includes the information representing the viewing place as the place where the user 100 is located. In the third embodiment, the second camera 50 for taking an image in the 360-degree direction corresponds to the second sensor.

Further, in the display method according to the third embodiment, obtaining the second information includes obtaining a third image including an area included in the 360-degree range centering on the second camera 50 based on the output of the second camera 50, and determining the viewing place based on the third image. As described above, out of the taken image obtained from the second camera 50, the taken image in which the area included in the 360-degree range centering on the second camera 50 shows up corresponds to the third image.

As shown in FIG. 16, the processor 47 executes the step S22 described above, and then determines (step S23) the first direction D1 based on a combination of the user ID of the user 100 and the viewing place. Specifically, in the step S23, the processor 47 determines the first direction D1 based on the combination of the user ID of the user 100 and the viewing place, and a direction setting table stored in advance in the memory 46. FIG. 18 is a diagram showing an example of the direction setting table. As shown in FIG. 18, the direction setting table is data representing correspondence relationships between combinations of the user IDs and the viewing places, and first direction candidates.

For example, in the direction setting table, the combination of the user ID corresponding to "user A" and the viewing place corresponding to "living room" is associated with "west" as the first direction candidate. Further, in the direction setting table, the combination of the user ID corresponding to "user B" and the viewing place corresponding to "bedroom" is associated with "east" as the first direction candidate. Further, in the direction setting table, the combination of the user ID corresponding to "user C" and the viewing place corresponding to "bedroom" is associated with "ceiling" as the first direction candidate.

In the step S23, the processor 47 determines the first direction candidate corresponding to the combination of the user ID of the user 100 and the viewing place out of the first direction candidates included in the direction setting table as the first direction D1. For example, as shown in FIG. 17, when "user A" is obtained as the user ID of the user 100 in the step S21, and "living room" is determined as the viewing place in the step S22, the processor 47 determines "west" as the first direction D1 out of the first direction candidates included in the direction setting table.

As described above, in the step S23, the processor 47 executes determining the first direction D1 based on the information representing the viewing place as the second information. In other words, the display method according to the third embodiment includes determining the first direction D1 based on the information representing the viewing place as the second information. Determining the first direction D1 includes determining the first direction D1 based on the combination of the user ID as the first information and the viewing place.

As shown in FIG. 16, the processor 47 executes the step S23 described above, and then controls (step S24) the drive device 30 so that the projection direction Dp of the projector 10B is turned to the first direction D1. More specifically, in the step S24, the processor 47 controls the yaw angle θ of the first drive device 31 and the pitch angle α of the second drive device 32 so that the projection direction Dp of the projector 10B is turned to the first direction D1.

Figure 19:
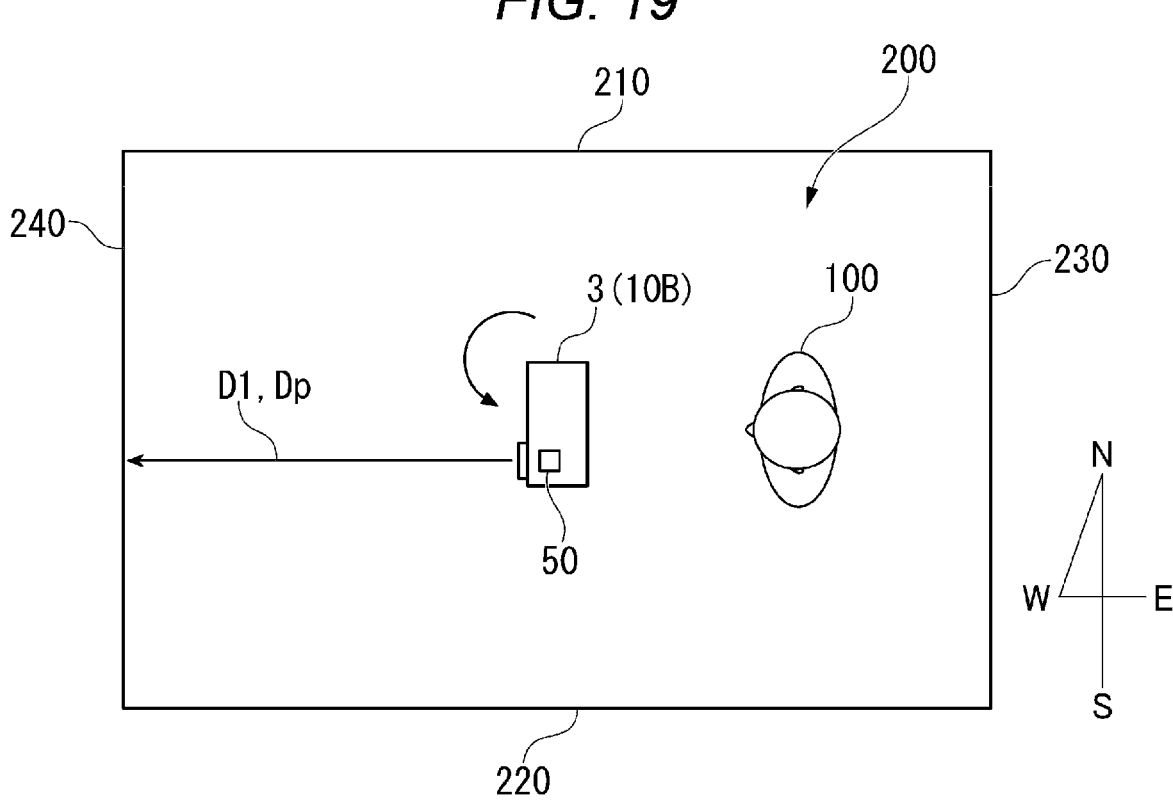
FIG. 19 is a diagram showing a condition in which the projection direction is turned to the first direction.

FIG. 19 is a diagram showing a condition in which the projection direction Dp of the projector 10B is turned to the first direction D1. For example, as described with reference to FIG. 17, when the processor 47 determines "west" as the first direction D1 in the state in which the projection direction Dp of the projector 10B is set in the eastward direction, the processor 47 controls the drive device 30 so that the projection direction Dp of the projector 10B is turned from east to west. As a result, as shown in FIG. 19, by the projector 10B rotating 180 degrees counterclockwise centering on the yaw axis Y, the projection direction Dp of the projector 10B is turned to west.

As shown in FIG. 16, the processor 47 executes the step S24 described above, and then determines (step S25) the projection content based on the combination of the user ID of the user 100 and the viewing place. Specifically, in the step S25, the processor 47 determines the projection content based on the combination of the user ID of the user 100 and the viewing place, and the second content selection table which is shown in FIG. 13 and is stored in advance in the memory 46.

In the step S25, the processor 47 first selects the video genre corresponding to the combination of the user ID of the user 100 and the viewing place from the video genres included in the second content selection table. For example, when "user A" is obtained as the user ID of the user 100 in the step S21, and "living room" is determined as the viewing place in the step S22, the processor 47 selects "movie" from the video genres included in the second content selection table. The processor 47 performs the same processing as the processing described in the first embodiment after selecting the video genre to thereby determine the projection content.

As described above, in the step S25, the processor 47 executes determining the projection content as the type of the image based on the combination of the user ID as the first information and the information representing the viewing place as the second information. In other words, the display method according to the third embodiment includes determining the projection content as the type of the image based on the combination of the user ID as the first information and the information representing the viewing place as the second information. Further, determining the projection content as the type of the image includes determining the projection content as the type of the image based on the combination of the user ID as the first information and the viewing place.

As shown in FIG. 16, the processor 47 executes the step S25 described above, and then controls (step S26) the optical device 41 so that the image light L representing the image of the projection content is projected. Since the processing in the step S26 in the third display processing is the same as the processing in the step S6 in the first display processing, the description related to the step S26 will be omitted.

Figure 20:
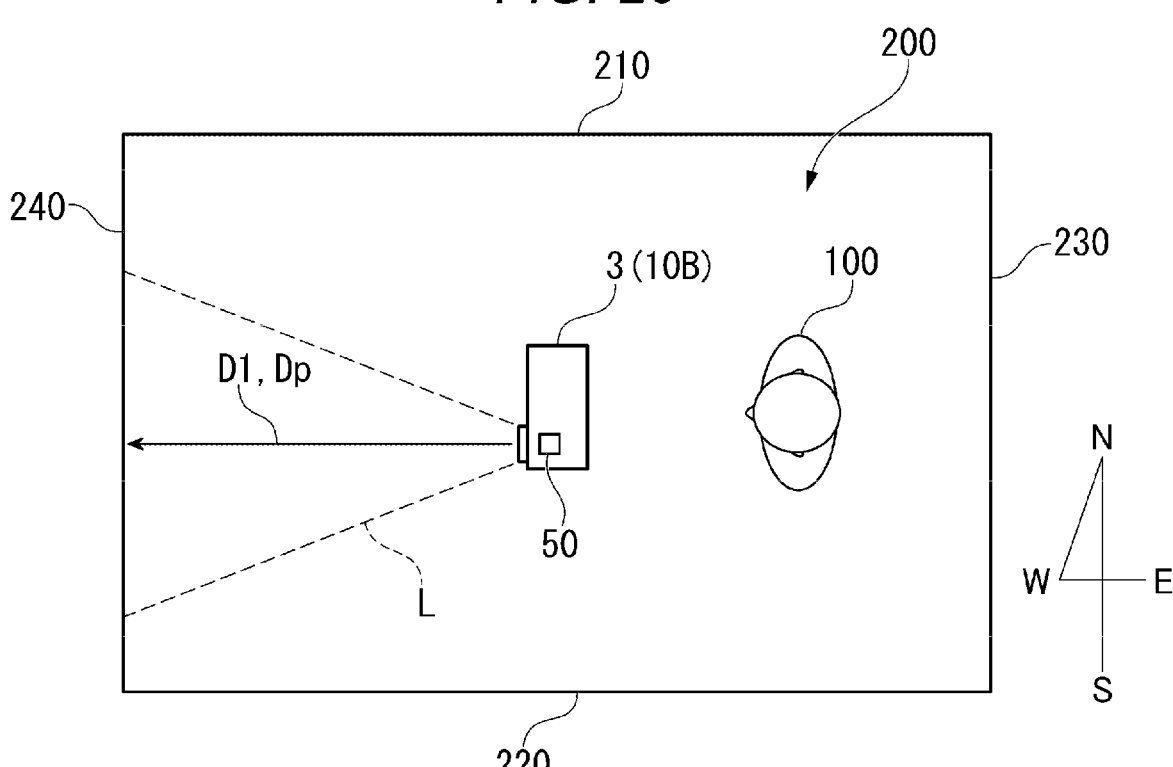
FIG. 20 is a diagram showing a condition in which image light is projected toward the first direction.

FIG. 20 is a diagram showing a condition in which the image light L is projected toward the first direction D1. For example, as shown in FIG. 20, when the processor 47 controls the optical device 41 so that the image light L representing the projection content is projected in the state in which the projection direction Dp of the projector 10B is turned to west as an example of the first direction D1, the image light L is projected westward from the projector 10B. As a result, the video content determined as the projection content is displayed on the west side wall surface 240 located at the front direction side of the user 100 out of the wall surfaces of the room 200.

As described above, in the steps S23 and S26, the processor 47 controls the optical device 41 and the drive device 30 to execute projecting the image light L representing the image of the projection content as the image of the determined type toward the first direction D1. In other words, the display method according to the third embodiment includes projecting the image light L representing the image of the projection content as the image of the determined type toward the first direction D1 with the projector 10B.

Advantages of Third Embodiment

As described above, the display method according to the third embodiment includes obtaining the user ID as the first information for identifying the user 100 based on the output of the microphone 48 as the first sensor, obtaining the information representing the viewing place as the second information related to the position of the user 100 based on the output of the second camera 50 as the second sensor, determining the first direction D1 based on the information representing the viewing place as the second information, determining the projection content as the type of the image based on the combination of the first information and the second information, and projecting the image light L representing the image of the projection content as the image of the determined type toward the first direction D1 with the projector 10B.

Similarly to the first embodiment and the second embodiment, in the display method according to the third embodiment, the projection content is determined based on the first information of identifying the user 100 and the second information related to the position of the user 100, and the image light L representing the image of the projection content is projected toward the first direction D1 determined based on the second information.

Thus, there is increased the possibility that the image of the video content suitable for the individual attribute and the position of the user 100 is displayed on the projection surface which is easy for the user 100 to visually recognize. Therefore, according to the display method in the third embodiment, it is possible to enhance the convenience of the user 100 when using the projector the projection direction Dp of which is variable.

In the display method according to the third embodiment, the second information includes the information representing the viewing place as a place where the user 100 is located, and determining the first direction D1 includes determining the first direction D1 based on the combination of the user ID as the first information and the viewing place.

As described above, by determining the first direction D1 based on the combination of the user ID as the first information and the viewing place, it is possible to display the image of the projection content on the projection surface which is easy for the user 100 to visually recognize in accordance with the individual attribute of the user 100 and the viewing place, and therefore, the convenience of the user 100 is enhanced.

In the display method according to the third embodiment, determining the projection content as the type of the image includes determining the projection content as the type of the image based on the combination of the user ID as the first information and the viewing place.

In the first embodiment, the projection content is determined based on the combination of the user ID as the first information and the sound source direction Ds. Since the sound source direction Ds is consistently a direction in which the user 100 is located with respect to the second sensor, it is difficult to determine the place where the user 100 is located, namely the room or the like to be the viewing place, from the sound source direction Ds.

Therefore, as described above, by determining the projection content based on the combination of the user ID as the first information and the viewing place, it is possible to display the image of the video content which is suitable for the individual attribute of the user 100 and the viewing place on the projection surface, and therefore, the convenience of the user 100 is further enhanced compared to the first embodiment.

In the display method according to the third embodiment, the second sensor is the second camera 50 for taking the image in the 360-degree direction, and obtaining the second information includes obtaining the third image including the area included in the 360-degree range centering on the second camera 50 based on the output of the second camera, and determining the viewing place based on the third image.

As described above, by determining the viewing place based on the third image obtained from the second camera 50 for taking the image in the 360-degree direction, it is possible to accurately obtain the second information related to the position of the user 100 using the single camera.

In the display method according to the third embodiment, the first sensor has at least one microphone 48, and obtaining the first information includes obtaining the voiceprint data of the user 100 based on the output of at least one microphone 48, and obtaining the user ID which is the identification information representing the user 100 as the first information based on the voiceprint data.

As described above, by obtaining the voiceprint data as biological data unique to the user 100 based on the output of at least one microphone 48, it is possible to accurately obtain the user ID of the user 100 as the first information.

The display system 3 according to the third embodiment is provided with the microphone 48 as the first sensor, the second camera 50 as the second sensor, the optical device 41 for projecting the image light L, the drive device 30 for turning the direction in which the image light L is projected to the predetermined direction, and the processor 47. The processor 47 executes obtaining the user ID as the first information for identifying the user 100 based on the output of the first sensor, obtaining the information representing the viewing place as the second information related to the position of the user 100 based on the output of the second sensor, determining the first direction D1 based on the second information, determining the projection content as the type of the image based on the combination of the first information and the second information, and projecting the image light L representing the image of the projection content as the image of the determined type toward the first direction D1 by controlling the optical device 41 and the drive device 30.

In the display system 3 according to the third embodiment, the projection content is determined based on the first information of identifying the user 100 and the information representing the viewing place as the second information related to the position of the user 100, and the image light L representing the image of the projection content is projected toward the first direction D1 determined based on the information representing the viewing place as the second information.

Thus, there is increased the possibility that the image of the video content suitable for the individual attribute and the position of the user 100 is displayed on the projection surface which is easy for the user 100 to visually recognize. Therefore, according to the display system 3 in the third embodiment, it is possible to enhance the convenience of the user 100 when using the projector 10B the projection direction Dp of which is variable.

Although the embodiments of the present disclosure are hereinabove described, the scope of the present disclosure is not limited to the embodiments described above, and a variety of modifications can be made within the scope or the spirit of the present disclosure.

For example, in the first embodiment and the second embodiment described above, there is illustrated the aspect in which the sound source direction Ds as the second direction in which the user 100 is located, and user direction Du, and the first direction D1 are each represented by four directions of north, south, east, and west. The present disclosure is not limited thereto, and each of the directions can be represented by a coordinate defined by the yaw angle θ and the pitch angle α.

For example, in the first embodiment described above, there is illustrated the aspect in which the projection direction Dp which is the direction in which the image light L is projected from the projector 10 to the first direction D1 by changing the orientation of the projector 10 with the drive device 30 externally attached to the projector 10. The present disclosure is not limited thereto, and there can be disposed a drive device for turning the direction in which the image light is projected from the optical device to a predetermined direction, inside the chassis of the projector. This drive device can be a device for mechanically changing the orientation of the optical device, or can also be a device for changing a proceeding direction of the image light with an optical element such as a mirror. As described above, the projector provided with the first sensor, the second sensor, the optical device, the drive device, and the processor can be said as the display system according to the present disclosure.

Conclusion of Present Disclosure

Hereinafter, the conclusion of the present disclosure will supplementarily be noted.

Supplementary Note 1

A display method includes obtaining first information which is configured to identify a user, based on output of a first sensor, obtaining second information which is related to a position of the user, based on output of a second sensor, determining a first direction based on the second information, determining a type of an image based on a combination of the first information and the second information, and projecting image light representing the image of the type toward the first direction with a projector.

The type of the image demanded by the user is different not only by an individual attribute such as the age, the gender, a job, or a hobby but also by the position of the user in some cases. In the display method according to Supplementary Note 1, the type of the image is determined based on the first information of identifying the user and the second information related to the position of the user, and the image light representing the image of the determined type is projected toward the first direction determined based on the second information.

Thus, there is increased the possibility that the image of the type suitable for the individual attribute and the position of the user is displayed on the projection surface which is easy for the user to visually recognize. Therefore, according to the display method in Supplementary Note 1, it is possible to enhance the convenience of the user when using the projector the projection direction of which is variable.

Supplementary Note 2

The display method according to Supplementary Note 1, wherein the second information includes information representing a second direction in which the user is located with respect to the second sensor, and the determining the first direction includes determining an opposite direction to the second direction as the first direction.

As described above, by determining the opposite direction to the second direction in which the user is located with respect to the second sensor as the first direction, it is possible to display the image of the determined type on the projection surface which is located at the front direction side of the user, namely the projection surface which is easy for the user to visually recognize, and therefore, the convenience of the user is enhanced.

Supplementary Note 3

The display method according to Supplementary Note 2, wherein the determining the type includes determining the type based on a combination of the first information and the second direction.

As described above, by determining the type of the image based on the combination of the first information and the second direction, it is possible to display the image of the type suitable for the individual attribute of the user and the second direction in which the user is located on the projection surface located at the front direction side of the user, and therefore, the convenience of the user is enhanced.

Supplementary Note 4

The display method according to one of Supplementary Note 2 and Supplementary Note 3, wherein the second sensor has a plurality of microphones, and the obtaining the second information includes calculating a time difference generated between times at which a sound wave reaches respective microphones from a sound source based on output of the plurality of microphones, and determining the second direction based on the time difference.

As described above, by calculating the time difference between the times at which the sound wave reaches the respective microphones from the sound source based on the output of the plurality of microphones, it is possible to accurately obtain a direction in which the sound source is located with reference to the second sensor as the second direction in which the user is located.

Supplementary Note 5

The display method according to Supplementary Note 2, wherein the second information further includes information representing a place where the user is located, and the determining the type includes determining the type based on a combination of the first information and the place.

In the display method according to Supplementary Note 3, the type of the image is determined based on the combination of the first information and the second direction. Since the second direction is consistently a direction in which the user is located with respect to the second sensor, it is difficult to determine the place where the user is located, from the second direction.

Therefore, by determining the type of the image based on the combination of the first information and the place where the user is located as in the display method according to Supplementary Note 5, it is possible to display the image of the type which is suitable for the individual attribute of the user and the place on the projection surface, and therefore, the convenience of the user is further enhanced compared to the display method according to Supplementary Note 3.

Supplementary Note 6

The display method according to Supplementary Note 5, wherein the second sensor is a first camera configured to take an image in one direction, and the obtaining the second information includes obtaining a first image including the user based on output of the first camera, determining the second direction based on the first image, obtaining a second image including an area located in the first direction based on the output of the first camera, and determining the place based on the second image.

As described above, by determining both of the second direction in which the user is located and the place where the user is located based on the first image and the second image obtained from the first camera, it is possible to accurately obtain the second information related to the position of the user using the single camera.

Supplementary Note 7

The display method according to Supplementary Note 1, wherein the second information includes information representing a place where the user is located, and the determining the first direction includes determining the first direction based on a combination of the first information and the place.

As described above, by determining the first direction based on the combination of the first information and the place where the user is located, it is possible to display the image of the determined type on the projection surface which is easy for the user to visually recognize in accordance with the individual attribute of the user and the place, the convenience of the user is enhanced.

Supplementary Note 8

The display method according to Supplementary Note 7, wherein the determining the type includes determining the type based on a combination of the first information and the place.

In the display method according to Supplementary Note 3, the type of the image is determined based on the combination of the first information and the second direction. Since the second direction is consistently a direction in which the user is located with respect to the second sensor, it is difficult to determine the place where the user is located, from the second direction.

Therefore, by determining the type of the image based on the combination of the first information and the place where the user is located as in the display method according to Supplementary Note 8, it is possible to display the image of the type which is suitable for the individual attribute of the user and the place on the projection surface, and therefore, the convenience of the user is further enhanced compared to the display method according to Supplementary Note 3.

Supplementary Note 9

The display method according to one of Supplementary Note 7 and Supplementary Note 8, wherein the second sensor is a second camera configured to take an image in a 360-degree direction, and the obtaining the second information includes obtaining a third image including an area included in a 360-degree range centering on the second camera based on the output of the second camera, and determining the place based on the third image.

As described above, by determining the place where the user is located based on the third image obtained from the second camera configured to take the image in the 360-degree direction, it is possible to accurately obtain the second information related to the position of the user using the single camera.

Supplementary Note 10

The display method according to any one of Supplementary Note 1 through Supplementary Note 9, wherein the first sensor has at least one microphone, and the obtaining the first information includes obtaining voiceprint data of the user based on output of the at least one microphone, and obtaining identification information representing the user as the first information based on the voiceprint data.

As described above, by obtaining the voiceprint data as biological data unique to the user based on the output of at least one microphone, it is possible to accurately obtain the identification information representing the user as the first information.

Supplementary Note 11

A display system including a first sensor, a second sensor, an optical device configured to project image light, a drive device configured to turn a direction in which the image light is projected to a predetermined direction, and a processor, wherein the processor is configured to execute obtaining first information which is configured to identify a user, based on output of the first sensor, obtaining second information which is related to a position of the user, based on output of the second sensor, determining a first direction based on the second information, determining a type of an image based on a combination of the first information and the second information, and controlling the optical device and the drive device to thereby project the image light representing the image of the type toward the first direction.

In the display system according to Supplementary Note 11, the type of the image is determined based on the first information of identifying the user and the second information related to the position of the user, and the image light representing the image of the determined type is projected toward the first direction determined based on the second information.

Thus, there is increased the possibility that the image of the type suitable for the individual attribute and the position of the user is displayed on the projection surface which is easy for the user to visually recognize. Therefore, according to the display system in Supplementary Note 11, it is possible to enhance the convenience of the user when using the projector the projection direction of which is variable.

What is claimed is:
1. A display method comprising:
    obtaining first information for identifying a user, based on output of a first sensor;
    obtaining second information which is related to a position of the user, based on output of a second sensor;
    determining a first direction based on the second information;
    determining an image genre based on a combination of the first information and the second information; and
    projecting image light representing the image genre toward the first direction with a projector; wherein:
    the second information includes information representing a second direction in which the user is located with respect to the second sensor;
    the determining the first direction includes determining an opposite direction to the second direction as the first direction;
    the second information further includes information representing a room type where the user is to be located, the room type being a kind of room;

the determining the image genre includes determining the image genre based on a combination of the first information and the room type;

the second sensor is a first camera configured to take an image in one direction; and the obtaining the second information includes:

obtaining a first image including the user based on output of the first camera;

determining the second direction based on the first image;

obtaining a second image including an area located in the first direction based on the output of the first camera; and determining the room type based on the second image.

2. The display method according to claim 1, wherein the determining the image genre includes determining the image genre based on a combination of the first information and the second direction.

3. The display method according to claim 1, wherein the first sensor has at least one microphone, and the obtaining the first information includes obtaining voiceprint data of the user based on output of the at least one microphone, and obtaining identification information representing the user as the first information based on the voiceprint data.

4. A display system comprising:

a first sensor;

a second sensor;

an optical device which projects image light;

a drive device configured to turn a direction in which the image light is projected to a predetermined direction; and a processor programmed to execute obtaining first information for identifying a user, based on output of the first sensor, obtaining second information which is related to a position of the user, based on output of the second sensor, determining a first direction based on the second information, determining an image genre based on a combination of the first information and the second information, and projecting the image light representing the image of the image genre toward the first direction by controlling the optical device and the drive device, wherein:

the second information includes information representing a second direction in which the user is located with respect to the second sensor;

the determining the first direction includes determining an opposite direction to the second direction as the first direction;

the second information further includes information representing a room type where the user is to be located, the room type being a kind of room;

the determining the image genre includes determining the image genre based on a combination of the first information and the room type;

the second sensor is a first camera configured to take an image in one direction; and the obtaining the second information includes:

obtaining a first image including the user based on output of the first camera;

determining the second direction based on the first image;

obtaining a second image including an area located in the first direction based on the output of the first camera; and determining the room type based on the second image.

5. A display method comprising:

obtaining first information for identifying a user, based on output of a first sensor;

obtaining second information which is related to a position of the user, based on output of a second sensor;

determining a first direction based on the second information;

determining an image genre based on a combination of the first information and the second information; and projecting image light representing the image genre toward the first direction with a projector, wherein:

the second information includes information representing a room type where the user is to be located, the room type being a kind of room;

the determining the first direction includes determining the first direction based on a combination of the first information and the room type;

the second sensor is a second camera configured to take an image in a 360-degree direction; and the obtaining the second information includes:

obtaining a third image including an area included in a 360-degree range centering on the second camera based on the output of the second camera, and determining the room type based on the third image.

6. The display method according to claim 5, wherein the determining the image genre includes determining the image genre based on a combination of the first information and the room type.

7. The display method according to claim 5, wherein the first sensor has at least one microphone, and the obtaining the first information includes obtaining voiceprint data of the user based on output of the at least one microphone, and obtaining identification information representing the user as the first information based on the voiceprint data.

\* \* \* \* \*